(12) United States Patent
Azuma

(10) Patent No.: US 6,613,134 B1
(45) Date of Patent: *Sep. 2, 2003

(54) JET PRINTING INK COMPOSITION COMPRISING OIL PHASE EMULSIFIED IN AQUEOUS MEDIUM

(75) Inventor: Yasushi Azuma, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 132 days.

This patent is subject to a terminal disclaimer.

(21) Appl. No.: 09/819,802

(22) Filed: Mar. 29, 2001

(30) Foreign Application Priority Data

Mar. 30, 2000 (JP) ......................................... 2000-095679

(51) Int. Cl.⁷ .............................................. C09D 11/02
(52) U.S. Cl. .................................................. 106/31.27
(58) Field of Search ........................ 106/31.26, 31.25, 106/31.43, 31.58

(56) References Cited

U.S. PATENT DOCUMENTS 4,246,154 A  *  1/1981  Yao ............................. 524/88
4,597,794 A      7/1986  Ohta et al.
6,020,400 A      2/2000  Anton et al.
2001/0045176 A1 * 11/2001 Kimura et al. ........... 106/31.47
2002/0007762 A1 *  1/2002 Arakawa .................. 106/31.27

FOREIGN PATENT DOCUMENTS

| JP | 62-207375 | 9/1987 |
| JP | 04-018468 | 1/1992 |
| JP | 08-183920 | 7/1996 |
| JP | 10-110126 | 4/1998 |

* cited by examiner

*Primary Examiner*—Helene Klemanski
(74) *Attorney, Agent, or Firm*—Burns, Doane, Swecker & Mathis, LLP

(57) ABSTRACT

In a jet printing ink composition, a dye dissolved in an oil phase. The oil phase is emulsified in an aqueous medium. The oil phase comprises an organic solvent having a boiling point of not lower than 150° C. The oil phase has a viscosity in the range of 20 to 8,000 mPa·s at 25° C. Droplets of the emulsified oil phase have a volumetric average diameter of not larger than 100 nm.

12 Claims, No Drawings

JET PRINTING INK COMPOSITION COMPRISING OIL PHASE EMULSIFIED IN AQUEOUS MEDIUM

FIELD OF THE INVENTION

The present invention relates to a jet printing ink composition which gives an image of high quality and which is stably jetted out.

BACKGROUND OF THE INVENTION

Ink-jet printers have been widely used in not only offices but also homes with the spread of personal computers. As image-receiving material for ink-jet printer, ordinary paper, film and cloth have been used as well as paper specialized in ink-jet printing. On the other hand, as ink for ink-jet printing, oleaginous ink, aqueous ink and solid ink have been proposed. Practically, aqueous ink is mainly used because it less smells and is easy and safe to produce and deal with.

An aqueous ink is generally prepared by dissolving water-soluble dye in water. The aqueous ink comprising aqueous dye solution is excellent in transparency and color density, but is poor in water resistance and light resistance. Further, when printed on ordinary paper, the aqueous ink is apt to bleed to impair printing quality.

An aqueous ink comprising dispersed pigment or dye in place of water-soluble dye has been proposed (for example, in Japanese Patent Provisional Publication Nos. 56(1981)-157468, 4(1992)-18468, 10(1998)-110126 and 10(1998)-195355). This ink is improved in water resistance in some degree, but that resistance is still insufficient. Further, the dispersed pigment or dye is generally inferior to water-soluble dye in coloration. Furthermore, since the dispersion is unstable, the pigment or dye often chokes a jet nozzle.

Japanese Patent Provisional Publication No. 58(1983)-45272 describes dye enclosed in particles of urethane polymer latex. However, if the dye is enclosed in the particles to such an extent that sufficient density can be obtained, troubles on dispersion stability of the colored particles are often observed.

Further, the ink comprising dispersed pigment or dye is hardly spread and fixed on porous glossy paper. Recent ink jet printers often print images of photographic quality on porous photographic glossy paper. Accordingly, if the ink is insufficiently spread and fixed on the paper, the image has poor wear resistance.

SUMMARY OF THE INVENTION

An object of the present invention is to provide an aqueous ink which is excellent in coloration, which does not choke a jet nozzle, in which fine particles are stably dispersed, and particularly which is spread and fixed well on porous photographic glossy paper.

The present invention provides a jet printing ink composition containing a dye dissolved in an oil phase, which is emulsified in an aqueous medium, wherein the oil phase comprises an organic solvent having a boiling point of not lower than 150° C., said oil phase having a viscosity in the range of 20 to 8,000 mPa·s at 25° C., and wherein droplets of the emulsified oil phase have a volumetric average diameter of not larger than 100 nm.

The invention also provides a process for the preparation of a jet printing ink composition, which comprises the steps of: dissolving a dye in an organic solvent having a boiling point of not lower than 150° C. to form an oil phase having a viscosity in the range of 20 to 8,000 mPa·s at 25° C.; and then emulsifying the oil phase in an aqueous. medium to form droplets of the oil phase having a volumetric-average diameter of not larger than 100 nm.

The invention further provides an ink-jet recording method in which an image is recorded with ink drops on an image-receiving material, said image-receiving material comprising a support and an image-receiving layer containing white inorganic pigment particles, and said ink drops being jetted out according to recording signals, wherein the ink drops consist of a jet printing ink composition containing a dye dissolved in an oil phase, which is emulsified in an aqueous medium, and wherein the oil phase comprises an organic solvent having a boiling point of not lower than 150° C., said oil phase having a viscosity in the range of 20 to 8,000 mPa·s at 25° C., and wherein droplets of the emulsified oil phase have a volumetric average diameter of not larger than 100 nm.

DETAILED DESCRIPTION OF THE INVENTION

The jet printing ink composition of the invention is an emulsion in which droplets of an oil phase are emulsified in an aqueous medium.

The term "aqueous medium" means water or a mixture of water and an organic solvent, which is miscible with water. The aqueous medium can further contain additives such as a surfactant, a wetting agent, a stabilizing agent and an antiseptic.

The oil phase can be obtained by dissolving an oleaginous dye in a water-incompatible organic solvent having a high boiling point (which is not lower than 150° C.). The oil phase can contain, if needed, additives such as an ultraviolet absorbing agent, an oxidation inhibitor, a stabilizing agent and a viscosity adjusting agent.

The oil phase has a specific gravity preferably in the range of 0.90 to 1.15 at 25° C., more preferably in the range of 0.95 to 1.10 at 25° C., and most preferably in the range of 0.95 to 1.05 at 25° C.

The oil phase has a viscosity in the range of 20 to 8,000 mPa·s, preferably in the range of 100 to 4,000 mPa·s, and more preferably in the range of 200 to 3,000 mPa·s. If the viscosity is too high, the ink is hardly spread and fixed on porous photographic glossy paper, and accordingly the wear resistance of printed image is impaired.

The viscosity of the oil phase can be measured according to known methods (for example, described in "JIKKEN KAGAKU KOZA", 4th edition, pp.113). It can be also measured by means of a commercially available viscometer (e.g., rotating-vibrating viscometer).

The viscosity of the oil phase can be controlled by the amount of the organic solvent dissolving the oleaginous dye and/or by selecting the solvent and the dye. The viscosity of the organic solvent directly affects that of the oil phase. Further, the oil phase having a low viscosity can be obtained by using an oleaginous dye having a molecular structure in which many ester linkages or ether linkages are contained and rotation between C—C or C-hetero atom is restricted in a small degree.

The oleaginous dye preferably has a water-solubility of not more than 1 wt.%.

Examples of yellow dye include aryl azo dyes, hetero aryl azo dyes, azomethine dyes, methine dyes and quinone dyes. The aryl azo dyes and the hetero aryl azo dyes can have, as a coupling component, phenols, naphthols, anilines, pyrazolones, pyridones or open-chained active methylene compounds. The azomethine dyes can have open-chained active methylene compounds as a coupling component. The methine dyes include benzylidene dyes and monomethine oxonol dyes. The quinone dyes include naphthoquinone dyes and anthraquinone dyes.

Further, quinophthalone dyes, nitro dyes, nitroso dyes, acridine dyes and acridinone dyes can be also used as yellow dye. A dye whose chromophore partially dissociates to give yellow color can be also used as yellow-dye. In that dye, a counter cation for dissociation may be either an inorganic cation (e.g., alkali metal ion, ammonium ion) or an organic cation (e.g., pyridinium ion, quaternary ammonium ion). Further, a polymer cation having a partial structure of cation can be used as a counter cation.

Examples of magenta dye include aryl azo dyes, hetero aryl azo dyes, azomethine dyes, methine dyes, carbonium dyes, quinone dyes and condensed pqlycyclic dyes. The aryl azo dyes and the hetero aryl azo dyes can have phenols, naphthols and anilines as a coupling component. The azomethine dyes can have, as a coupling component, pyrazolones and pyrazolotriazole open-chained active methylene compounds. The methine dyes include arylidene dyes, styryl dyes, merocyanine dyes and oxonol dyes. The carbonium dyes include diphenylmethane dyes, triphenylmethane dyes and xanthene dyes. The quinone dyes include anthraquinone dyes and anthrapyridone dyes. The condensed polycyclic dyes include dioxadine dyes.

A dye whose chromophore partially dissociates to give magenta color can be also used as magenta dye. In that dye, a counter cation for dissociation may be either an inorganic cation (e.g., alkali metal ion, ammonium ion) or an organic cation (e.g., pyridinium ion, quaternary ammonium ion). Further, a polymer cation having a partial structure of cation can be used as a counter cation.

Examples of cyan dye include azomethine dyes, polymethine dyes, carbonium dyes, phthalocyanine dyes, anthraquinone dyes, aryl azo dyes, hetero aryl azo dyes, indigo dyes and thioindigo dyes. The azomethine dyes include indoaniline dyes and indophenol dyes. The polymethine dyes include cyanine dyes, oxonol dyes and merocyanine dyes. The carbonium dyes include diphenylmethane dyes, triphenylmethane dyes and xanthene dyes. The aryl azo dyes and the hetero aryl azo dyes can have, as a coupling component, phenols, naphthols and anilines.

A dye whose-chromophore partially dissociates to give cyan color can be also used as cyan dye. In the dye, a counter cation for dissociation may be either an inorganic cation (e.g., alkali metal ion, ammonium ion) or an organic cation (e.g., pyridinium ion, quaternary ammonium ion). Further, a polymer cation having a partial structure of cation can be used as a counter cation.

Examples of preferred oleaginous dye include the following dyes set forth in color index (C.I.): solvent black 3, 7, 27, 29, 34; solvent yellow 14, 16, 19, 29, 30, 56, 82, 93, 162; solvent red 1, 3, 8, 18, 24, 27, 43, 49, 51, 72, 73, 109, 122, 132, 218; solvent violet 3; solvent blue 2, 11, 25, 35, 70; solvent green 3, 7; solvent orange 2; disperse yellow 5, 42, 54, 64, 79, 82, 83, 93, 99, 100, 119, 122, 124, 126, 160, 184:1, 186, 198, 199, 201, 204, 224, 237; disperse orange 13, 29, 31:1, 33, 49, 54, 55, 66, 73, 118, 119, 163; disperse red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; disperse violet 33; disperse blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and disperse green 6:1, 9.

Commercially available oleaginous dyes (e.g., Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS [Orient Chemicals Co., Ltd.]; Neopan Yellow 075, Neopan Magenta SE1378, Neopan Blue 808, Neopan Blue FF4012, Neopan Cyan FF4238 [BASF]) are also usable.

The oleaginous azomethine dye represented by the following formula (I) is preferred.

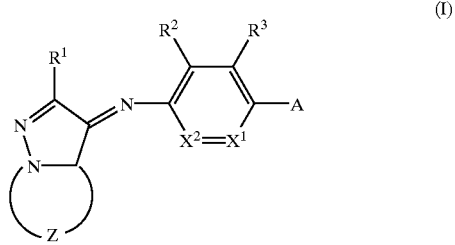

(I)

In the formula (I), $R^1$ is hydrogen atom, an aliphatic group, an aromatic group, a heterocyclic group, cyano, $-OR^{11}$, $-SR^{12}$, $-COOR^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}COOR^{26}$, $-COR^{27}$, $-NR^{28}COR^{29}$ or $-NR^{30}SO_2R^{31}$ in which each of $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ is independently hydrogen atom, an aliphatic group or an aromatic group; A is hydroxyl or $-NR^4R^5$ in which each of $R^4$ and $R^5$ is independently hydrogen atom, an aliphatic group, an aromatic group or a heterocyclic group; $X^1$ is $=C(R^6)-$ or $=N-$; $X^2$ is $-C(R^7)=$ or $-N=$; each of $R^2$, $R^3$, $R^6$ and $R^7$ is independently hydrogen atom, a halogen atom, an aliphatic group, an aromatic group, a heterocyclic group, cyano, $-OR^{51}$, $-SR^{52}$, $-COOR^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $-NR^{65}COOR^{66}$, $-COR^{67}$, $-NR^{68}COR^{69}$ or $-NR^{70}SO_2R^{71}$ in which each of $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ is independently hydrogen atom, an aliphatic group or an aromatic group; each combination of $R^2$ and $R^3$, $R^3$ and $R^4$, $R^4$ and $R^5$, $R^5$ and $R^6$, and $R^6$ and $R^7$ may be combined to form a ring; Z is an atomic group forming a 5- or 6-membered nitrogen-containing heterocyclic ring which may be substituted with an aliphatic group, an aromatic group, a heterocyclic group, cyano, $-OR^{81}$, $-SR^{82}$, $-COOR^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}COOR^{96}$, $-COR^{97}$, $-NR^{98}COR^{99}$ or $-NR^{100}SO_2R^{101}$ in which each of $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ is independently hydrogen atom, an aliphatic group or an aromatic group; and the nitrogen-containing heterocyclic ring may be condensed with another ring.

In the formula (I), Z is preferably $-Y^2=Y^1-N=$. Here, one of $Y^1$ and $Y^2$ is $-C(R^8)=$ and the other is $-N=$ in which $R^8$ is hydrogen atom, an aliphatic group or an aromatic group.

In the formula (I), A is preferably $-NR^4R^5$.

An oleaginous pyrazoloazole azomethine dye represented by the following formula (II) is more preferred.

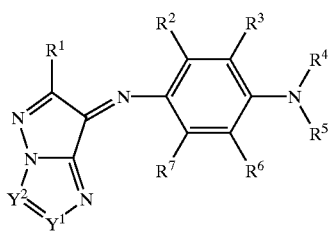

(II)

In the formula (II), each of $R^1$, $R^2$, $R^3$, $R^4$, $R^5$, $R^6$ and $R^7$ is the same as that defined for the formula (I).

In the formula (II), one of $Y^1$ and $Y^2$ is —C($R^8$)= and the other is —N= in which $R^8$ is hydrogen atom, an aliphatic group or an aromatic group. It is particularly preferred that $Y^1$ and $Y^2$ be —C($R^8$)= and —N=, respectively.

In the formula (I), $R^1$ is hydrogen atom, an aliphatic group, an aromatic group, a heterocyclic group, cyano, —$OR^{11}$, —$SR^{12}$, —$COOR^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}COOR^{26}$, —$COR^{27}$, —$NR^{28}COR^{29}$ or —$NR^{30}SO_2R^{31}$ in which each of $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ is independently hydrogen atom, an aliphatic group or an aromatic group.

$R^1$ preferably is hydrogen atom, an aliphatic group, an aromatic group, —$OR^{11}$, —$SR^{12}$, —$NR^{15}R^{16}$, —$SO_2R^{19}$, —$NR^{22}$—$CONR^{23}R^{24}$, —$NR^{25}COOR^{26}$, —$NR^{28}COR^{29}$ or —$NR^{30}SO_2R^{31}$; more preferably is hydrogen atom, an aliphatic group, an aromatic group, —$OR^{11}$ or —$NR^{15}R^{16}$; further preferably is hydrogen atom, an alkyl group, a substituted alkyl group, an aryl group, a substituted aryl group, an alkoxy group, a substituted alkoxy group, a phenoxy group, a substituted phenoxy group, a dialkylamino group or a substituted dialkylamino group; furthermore preferably is hydrogen atom, an alkyl group having 1 to 10 carbon atoms, a substituted alkyl group having 1 to 10 carbon atoms, an aryl group having 6 to 10 carbon atoms or a substituted aryl group having 6 to 10 carbon atoms; and most preferably is hydrogen atom, an alkyl group having 1 to 6 carbon atoms or a substituted alkyl group having 1 to 6 carbon atoms.

In the present specification, the term "an aliphatic group" means an alkyl group, a substituted alkyl group, an alkenyl group, a substituted alkenyl group, an alkynyl group, a substituted alkynyl group, an aralkyl group or a substituted aralkyl group.

The alkyl group may have a branched or cyclic structure. The alkyl group preferably has 1 to 20 carbon atoms, more preferably 1 to 18 carbon atoms.

The alkyl moiety of the substituted alkyl group is the same as the alkyl group described above.

The alkenyl group may have a branched or cyclic structure. The alkenyl group preferably has 2 to 20 carbon atoms, more preferably 2 to 18 carbon atoms.

The alkenyl moiety of the substituted alkenyl group is the same as the alkenyl group described above.

The alkynyl group may have a branched or cyclic structure. The alkynyl group preferably has 2 to 20 carbon atoms, more preferably 2 to 18 carbon atoms.

The alkynyl moiety of the substituted alkynyl group is the same as the alkynyl group described above.

The alkyl moiety of the aralkyl group or the substituted aralkyl group is the same as the alkyl group described above.

The aryl moiety of the aralkyl group or the substituted aralkyl group is the same as the aryl group described below.

Examples of the substituent group of the alkyl moiety of the substituted alkyl group, the substituted alkenyl group, the substituted alkynyl group or the substituted aralkyl group include a halogen atom, cyano, nitro, a heterocyclic group, —$OR^{111}$, —$SR^{112}$, —$COOR^{113}$, —$NR^{114}R^{115}$, —$CONR^{116}R^{117}$, —$SO_2R^{118}$ and —$SO_2NR^{119}R^{120}$ in which each of $R^{111}$, $R^{112}$, $R^{113}$, $R^{114}$, $R^{115}$, $R^{116}$, $R^{117}$, $R^{118}$, $R^{119}$ and $R^{120}$ is independently hydrogen atom, an aliphatic group or an aromatic group.

Examples of the substituent group of the aryl moiety of the substituted aralkyl group are the same as those of the substituted aryl group described below.

In the present specification, the term "an aromatic group" means an aryl group or a substituted aryl group.

The aryl group is preferably phenyl or naphthyl, more preferably phenyl.

The aryl moiety of the substituted aryl group is the same as the aryl group described above.

Examples of the substituent group of the substituted aryl group include a halogen atom, cyano, nitro, an aliphatic group, a heterocyclic group, —$OR^{121}$, —$SR^{122}$, —$COOR^{123}$, —$NR^{124}R^{125}$, —$CONR^{126}R^{127}$, —$SO_2R^{128}$ and —$SO_2NR^{129}R^{130}$ in which each of $R^{121}$, $R^{122}$, $R^{123}$, $R^{124}$, $R^{125}$, $R^{126}$, $R^{127}$, $R^{128}$, $R^{129}$ and $R^{130}$ is independently hydrogen atom, an aliphatic group or an aromatic group.

In the present specification, the heterocyclic group preferably contains a 5- or 6-membered saturated or unsaturated heterocyclic ring which may be condensed with an aliphatic ring, an aromatic ring or another heterocyclic ring. Examples of the hetero atom in the heterocyclic ring include B, N, O, Se and Te. A preferred hetero atom is N, O or S. The heterocyclic ring preferably has a monovalent carbon atom (through which the heterocyclic group is combined). Examples of the saturated heterocyclic ring include pyrrolidine ring, morpholine ring, 2-bora-1,3-dioxolan ring and 1,3-thiazolidine ring. Examples of the unsaturated heterocyclic ring include imidazole ring, thiazole ring, benzothiazole ring, benzoxazole ring, benzotriazole ring, benzoselenazole ring, pyridine ring, pyrimidine ring and quinoline ring.

The heterocyclic group may have a substituent. Examples of the substituent include a halogen atom, cyano, nitro, an aliphatic group, an aromatic group, a heterocyclic group, —$OR^{131}$, —$SR^{132}$, —$COOR^{133}$, —$NR^{134}R^{135}$, —$CONR^{136}R^{137}$, —$SO_2R^{138}$ and —$SO_2NR^{139}R^{140}$ in which each of $R^{131}$, $R^{132}$, $R^{133}$, $R^{134}$, $R^{135}$, $R^{136}$, $R^{137}$, $R^{138}$, $R^{139}$ and $R^{140}$ is independently hydrogen atom, an aliphatic group or an aromatic group.

In the formula (I), A is hydroxyl or —$NR^4R^5$, and —$NR^4R^5$ is preferred to hydroxyl. Each of $R^4$ and $R^5$ is independently hydrogen atom, an aliphatic group, an aromatic group or a heterocyclic group; preferably is hydrogen atom or an aliphatic group; more preferably is hydrogen atom, an alkyl group or a substituted alkyl group; and most preferably is hydrogen atom, an alkyl group having 1 to 18 carbon atoms or a substituted alkyl group having 1 to 18 carbon atoms.

In the formula (I), $X^1$ is =C($R^6$)— or =N—, and $X^2$ is —C($R^7$)= or —N=. One of $X^1$ and $X^2$ is preferably =C($R^6$)— or —C($R^7$)=. More preferably, $X^1$ is =C($R^6$)— and $X^2$ is —C($R^7$)=.

In the formula (I), each of $R^2$, $R^3$, $R^6$ and $R^7$ is independently hydrogen atom, a halogen atom, an aliphatic group, an aromatic group, a heterocyclic group, cyano, —$OR^{51}$, —$SR^{52}$, —$COOR^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}COOR^{66}$, —$COR^{67}$, —$NR^{68}COR^{69}$ or —$NR^{70}SO_2R^{71}$ in which each of $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ is independently hydrogen atom, an aliphatic group or an aromatic group.

Each of $R^2$ and $R^7$ preferably is independently hydrogen atom, a halogen atom, an aliphatic group, $-OR^{51}$, $-NR^{62}CO-NR^{63}R^{64}$, $-NR^{65}COOR^{66}$, $-NR^{68}COR^{69}$ or $-NR^{70}SO_2R^{71}$; more preferably is hydrogen atom, fluorine atom, chlorine atom, an alkyl group, a substituted alkyl group, $-NR^{62}CONR^{63}R^{64}$ or $-NR^{68}COR^{69}$; further preferably is hydrogen atom, chlorine atom, an alkyl group having 1 to 10 carbon atoms and a substituted alkyl group having 1 to 10 carbon atoms; most preferably is hydrogen atom, an alkyl group having 1 to 4 carbon atoms and a substituted alkyl group having 1 to 4 carbon atoms.

Each of $R^3$ and $R^6$ preferably is independently hydrogen atom, a halogen atom or an aliphatic group; more preferably is hydrogen atom, fluorine atom, chlorine atom, an alkyl group or a substituted alkyl group; further preferably is hydrogen atom, chlorine atom, an alkyl group having 1 to 10 carbon atoms and a substituted alkyl group having 1 to 10 carbon atoms; and most preferably is hydrogen atom, an alkyl group having 1 to 4 carbon atoms and a substituted alkyl group having 1 to 4 carbon atoms. In the formula (I), each combination of $R^2$ and $R^3$, $R^3$ and $R^4$, $R^4$ and $R^5$, $R^5$ and $R^6$, and $R^6$ and $R^7$ may be combined to form a ring. The set of $R^3$ and $R^4$, $R^4$ and $R^5$, or $R^5$ and $R^6$ preferably forms a ring.

The ring formed by the set of $R^2$ and $R^3$ or the set of $R^6$ and $R^7$ is preferably a 5- or 6-membered ring. The ring is preferably an aromatic ring (e.g., benzene ring) or an unsaturated heterocyclic ring (e.g., pyridine ring, imidazole ring, thiazole ring, pyrimidine ring, pyrrole ring, furan ring).

The ring formed by the set of $R^3$ and $R^4$ or the set of $R^5$ and $R^6$ is preferably a 5- or 6-membered ring, examples of which include tetrahydroquinoline ring and dihydroindole ring.

The ring formed by the set of $R^4$ and $R^5$ is preferably a 5- or-6-membered ring, examples of which include pyrrolidine ring, piperidine ring and morpholine ring.

In the formula (I), Z is an atomic group forming a 5- or 6-membered nitrogen-containing heterocyclic ring. Preferably, Z forms a 5-membered nitrogen-containing heterocyclic ring. Examples of the 5-membered nitrogen-containing heterocyclic ring include imidazole ring, triazole ring and tetrazole ring. Preferred is triazole ring, and more preferred is the triazole ring represented by the formula (II).

The nitrogen-containing heterocyclic ring may be substituted with an aliphatic group, an aromatic group, a heterocyclic group, cyano, $-OR^{81}$, $-SR^{82}$, $-COOR^{83}$, $-OCOR^{84}$, $-NR^{85}R^{86}$, $-CONR^{87}R^{88}$, $-SO_2R^{89}$, $-SO_2NR^{90}R^{91}$, $-NR^{92}CONR^{93}R^{94}$, $-NR^{95}COOR^{96}$, $-COR^{97}$, $-NR^{98}COR^{99}$ or $-NR^{100}SO_2R^{101}$. Each of $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ is independently hydrogen atom, an aliphatic group or at aromatic group. The nitrogen-containing heterocyclic ring may be condensed with another ring. The nitrogen-containing heterocyclic ring may be condensed with another ring.

In the formula (II), each of $Y^1$ and $Y^2$ is independently $-C(R^8)=$ or $-N=$ in which $R^8$ is hydrogen atom, an aliphatic group or an aromatic group. $R^8$ preferably is hydrogen atom, an alkyl group, a substituted alkyl group, an aryl group or a substituted aryl group; more preferably is hydrogen atom; a substituted alkyl group having 1 to 150 carbon atoms or a substituted aryl group having 6 to 150 carbon atoms; and most preferably is a substituted alkyl group having 1 to 100 carbon atoms or a substituted aryl group having 6 to 100 carbon atoms. In the case where each of $Y^1$ and $Y^2$ is $-C(R^8)=$, the two $R^8$s may be combined to form a ring. The ring is preferably a 6-membered ring, and is preferably an aromatic ring (e.g., benzene ring).

It is particularly preferred that $Y^1$ and $Y^2$ be $-C(R^8)=$ and $-N=$, respectively.

Examples of the azomethine dye represented by the formula (I) are shown below.

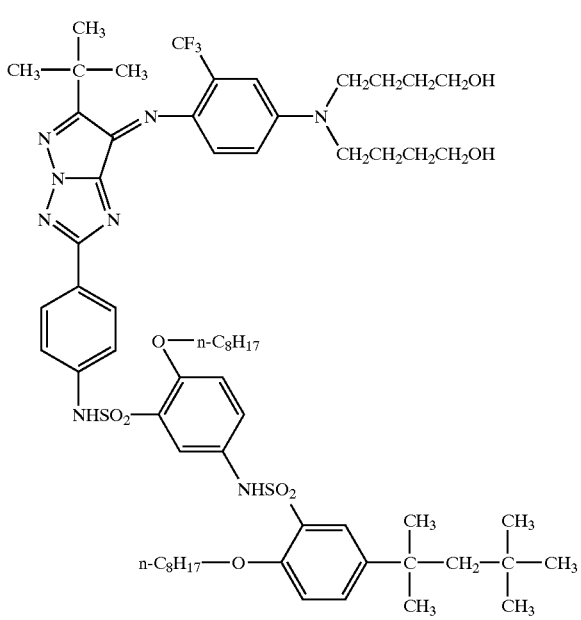

d-1 d-2
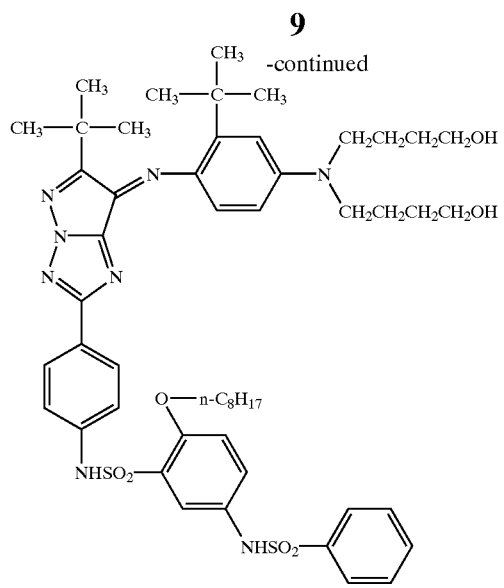
d-3
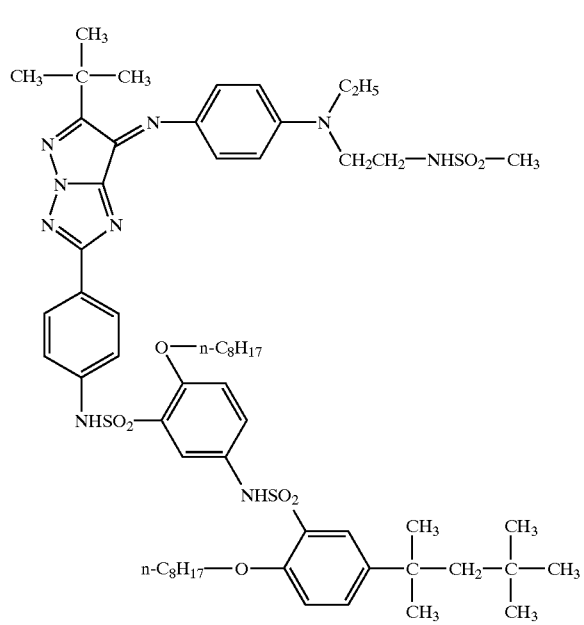
d-4
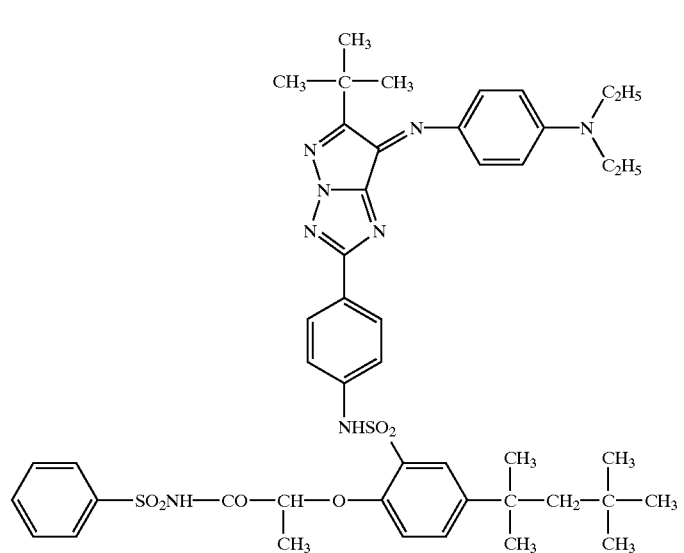

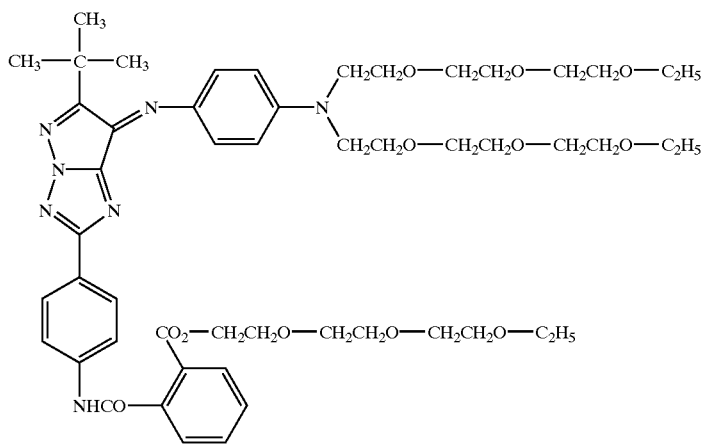
d-5
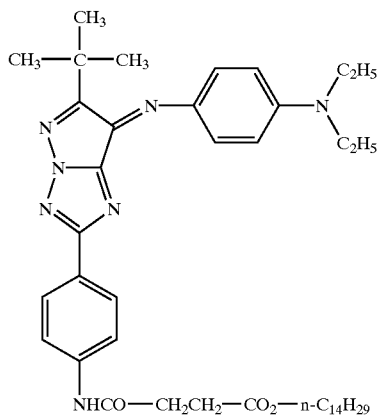
d-6
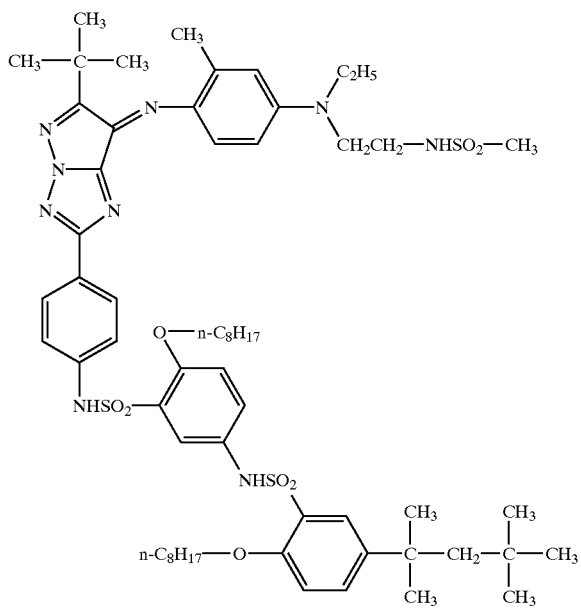
d-7

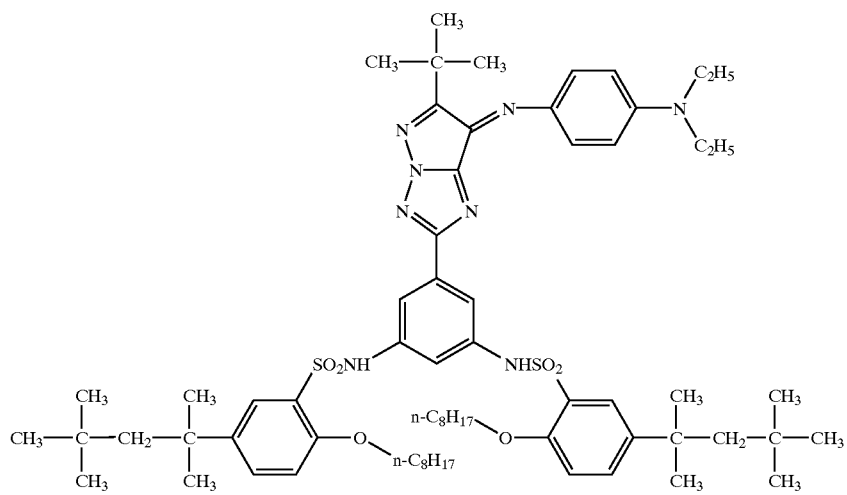
d-8
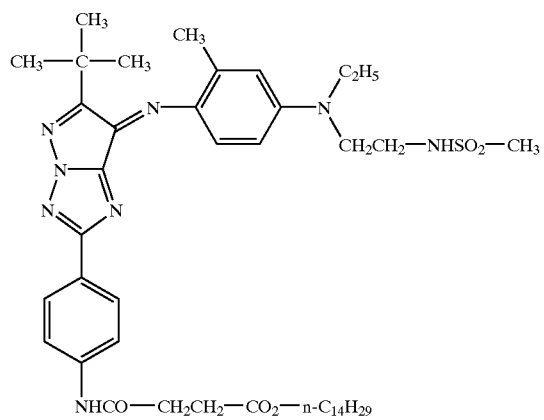
d-9
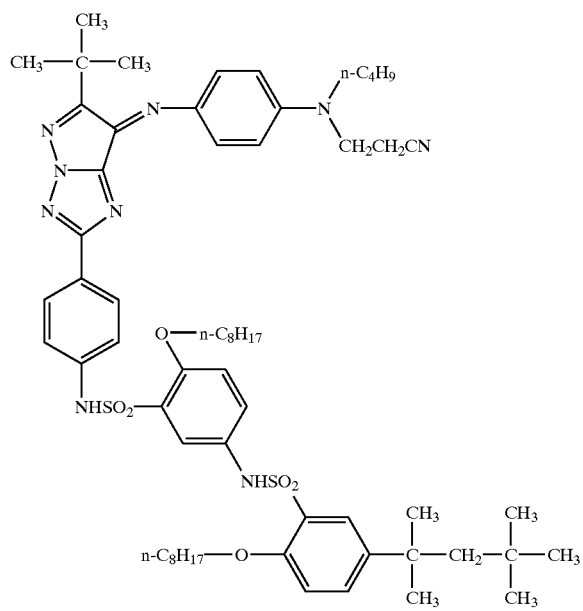
d-10

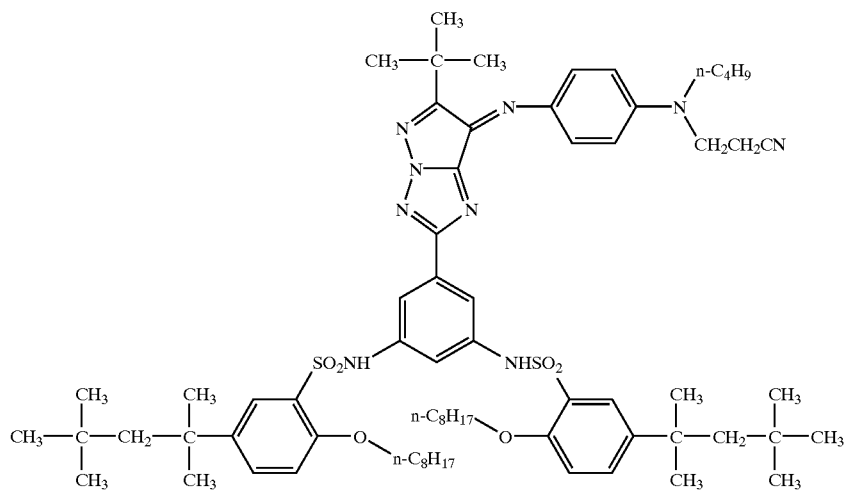

d-11

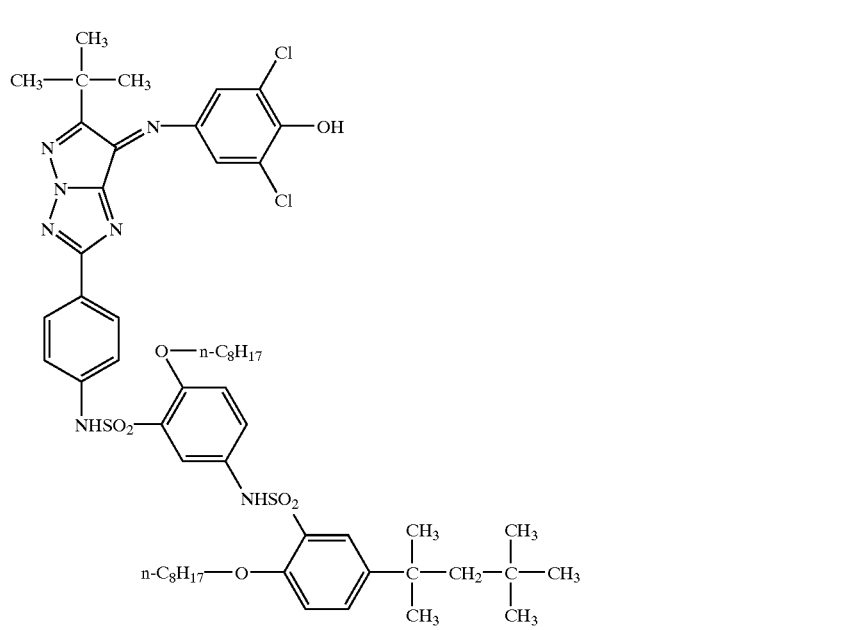

d-12

The azomethine dyes represented by the formula (I) can be synthesized according to Japanese Patent Provisional Publication No. 4(1992)-126772 and Japanese Patent Publication No. 7(1995)-94180.

Two or more dyes can be used in combination.

The organic solvent has a boiling point of not lower than 150° C. The boiling point is preferably not lower than 170° C. The dielectric constant (relative dielectric constant at 25° C.) of the organic solvent is in the range of preferably 3 to 12, more preferably 4 to 10.

The high boiling point organic solvent is described in U.S. Patent No. 2,322,027.

Examples of the high boiling point organic solvents include phosphoric esters, esters of fatty acid, phthalic esters, benzoic esters, phenols and amides.

Preferred examples of the high boiling point organic solvents are shown below.

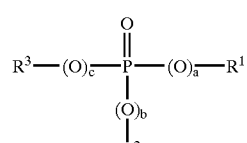 (S-I)

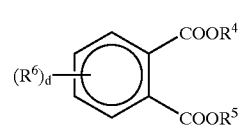 (S-II)

 (S-III)

 (S-IV)

 (S-V)

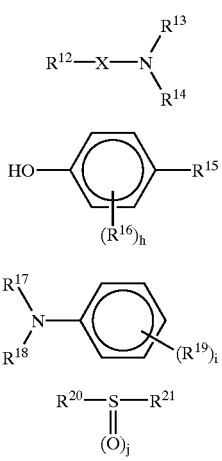

In the formula (S-I), each of $R^1$, $R^2$ and $R^3$ is independently an aliphatic group or an aryl group.

In the formula (S-I), each of a, b and c is independently an integer of 0 or 1.

In the formula (S-II), each of $R^4$ and $R^5$ is independently an aliphatic group or an aryl group.

In the formula (S-II), $R^6$ is a halogen, atom (F, Cl, Br, I), an alkyl group, an alkoxy group, an aryloxy group, an alkoxycarbonyl group or an aryloxycarbonyl group.

In the formula (S-II), d is an integer of 0 to 3. In the case where d is 2 or 3, plural groups of $R^3$ may be different from each other.

In the formula (S-III), Ar is an aryl group.

In the formula (S-III), e is an integer of 1 to 6.

In the formula (S-III), $R^7$ is a hydrocarbon group having e valences. The hydrocarbon group may have an ether linkage in the main chain.

In the formula (S-IV), $R^8$ is an aliphatic group.

In the formula (S-IV), f is an integer of 1 to 6.

In the formula (S-IV), $R^9$ is a hydrocarbon group having f valences. The hydrocarbon group may have an ether linkage in the main chain.

In the formula (S-V), g is an integer of 2 to 6.

In the formula (S-V), $R^{10}$ is an aliphatic group having g valences.

In the formula (S-V), $R^{11}$ is an aliphatic group or an aryl group.

In the formula (S-VI), each of $R^{12}$, $R^{13}$ and $R^{14}$ is independently hydrogen atom, an aliphatic group or an aryl group.

In the formula (S-VI), X is —CO— or —$SO_2$—. The set of $R^{12}$ and $R^{13}$ or the set of $R^{13}$ and $R^{14}$ may be combined to form a ring.

In the formula (S-VII), $R^{15}$ is an aliphatic group, an alkoxycarbonyl group, an aryloxycarbonyl group, an alkylsulfonyl group, an arylsulfonyl group, an aryl group or cyano.

In the formula (S-VII), $R^{16}$ is a halogen atom, an aliphatic group, an aryl group, an alkoxy group or an aryloxy group.

In the formula (S-VII), h is an integer of 0 to 3. In the case where h is 2 or 3, plural groups of $R^{16}$ may be different from each other.

In the formula (S-VIII), each of $R^{17}$ and $R^{18}$ is independently an aliphatic group or an aryl group.

In the formula (S-VIII), $R^{19}$ is a halogen atom, an aliphatic group, an aryl group, an alkoxy group or an aryloxy group.

In the formula (S-VIII), i is an integer of 0 to 4. In the case where i is 2, 3 or 4, plural groups of $R^{19}$ may be different from each other.

In the formula (S-IX), each of $R^{20}$ and $R^{21}$ is independently an aliphatic group or an aryl group.

In the formula (S-IX), j is an integer of 1 or 2.

The aliphatic group in the formulas (S-I) to (S-IX) may have a branched or cyclic structure. Examples of the substituent group of the aliphatic group include a halogen atom, an aryl group, an alkoxy group, an aryloxy group, an alkoxycarbonyl group, hydroxyl, an acyloxy group and an epoxy group.

In the case where the aliphatic group in the formulas (S-I) to (S-IX) has a cyclic structure, the ring preferably consists of 3 to 7 members. Examples of the substituent group of the cyclic aliphatic group include a halogen atom, an aliphatic group, hydroxyl, an acyl group, an aryl group, an alkoxy group and an epoxy group. The cyclic aliphatic group may have a cross-linked structure. Examples of the linking group composing the cross-linked structure include methylene, ethylene and isopropylidene.

The aryl group in the formulas (S-I) to (S-IX) may have a substituent group. Examples of the substituent group include a halogen atom, an aliphatic group, an aryl group, an alkoxy group, an aryloxy group and an alkoxycarbonyl group.

The hydrocarbon group in the formulas (S-I) to (S-IX) may have a cyclic structure or an unsaturated linkage. Examples of the ring of the cyclic structure include benzene ring, cyclopentane ring and cyclohexane ring. The hydrocarbon group may have a substituent group. Examples of the substituent group include a halogen atom, hydroxyl, an acyloxy group, an aryl group, an alkoxy group, an aryloxy group and an epoxy group.

In the formula (S-I), each of $R^1$, $R^2$ and $R^3$ preferably is independently an aliphatic group having 3 to 24 carbon atoms or an aryl group having 6 to 24 carbon atoms, and more preferably is an aliphatic group having 4 to 18 carbon atoms or an aryl group having 6 to 18 carbon atoms.

Examples of the aliphatic group include n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl and 4-methylcyclohexyl.

Examples of the aryl group include phenyl, cresyl, p-nonylphenyl, xylyl, cumenyl, p-methoxyphenyl and p-methoxycarbonylphenyl.

In the formula (S-I), each of a, b and c is preferably 1.

In the formula (S-II), each of $R^4$ and $R^5$ preferably is independently an aliphatic group having 3 to 24 carbon atoms or an aryl group having 6 to 24 carbon atoms, and more preferably is an aliphatic group having 4 to 18 carbon. atoms or an aryl group having 6 to 18 carbon atoms.

Examples of the aliphatic group include n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl and 1-methylcyclohexyl.

Examples of the aryl group include phenyl, cresyl, p-nonylphenyl, xylyl, cumenyl, p-methoxyphenyl, p-methoxycarbonylphenyl, 4-t-butylphenyl, 4-t-octylphenyl, 1,3,5-trimethylphenyl, 2,4-di-t-butylphenyl and 2,4-di-t-pentylphenyl.

In the formula (S-II), $R^6$ preferably is a halogen atom, an alkyl group having 1 to 18 carbon atoms, an alkoxy group having 1 to 18 carbon atoms, an aryloxy group having 6 to 18 carbon atoms, an alkoxycarbonyl group having 2 to 19 carbon atoms or an aryloxycarbonyl group having 6 to 25 carbon atoms.

The halogen atom is preferably chlorine atom.

Examples of the alkyl group include methyl, isopropyl, t-butyl and n-dodecyl.

Examples of the alkoxy group include methoxy, n-butoxy, n-octyloxy, methoxyethoxy and benzyloxy.

Examples of the aryloxy group include phenoxy, p-tolyloxy, 4-methoxyphenoxy and 4-t-butylphenoxy.

Examples of the alkoxycarbonyl group include methoxycarbonyl, n-butoxycarbonyl and 2-ethylhexyloxycarbonyl.

In the formula (S-II), d is preferably 0 or 1.

In the formula (S-III), Ar preferably is an aryl group having 6 to 24 carbon atoms, more preferably is an aryl group having 6 to 18 carbon atoms.

Examples of the aryl group include phenyl, 4-chlorophenyl, 4-methoxyphenyl, 1-naphthyl, 4-n-butylphenyl and 1,3,5-trimethylphenyl.

In the formula (S-III), e is an integer of preferably 1 to 4, more preferably 1 to 3.

In the formula (S-III), $R^7$ is an e-valent hydrocarbon group having preferably 2 to 24 carbon atoms, more preferably 2 to 18 carbon atoms.

Examples of the hydrocarbon group include an alkyl group, a cycloalkyl group, an aryl group, —(CH$_2$)$_2$— and the groups shown below:

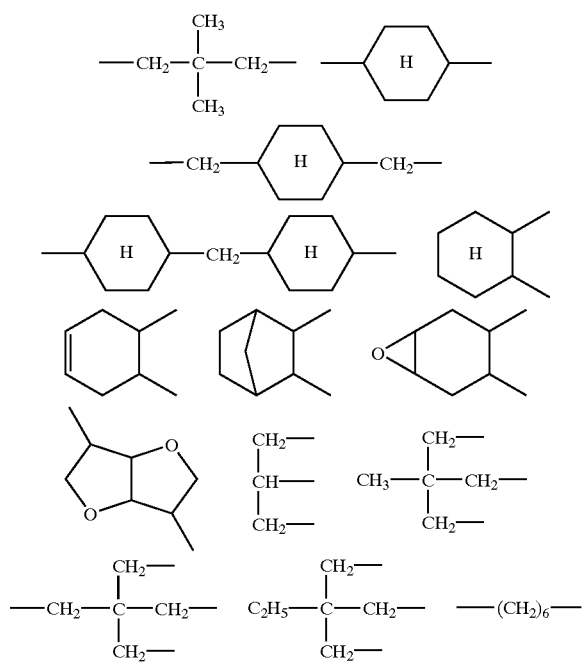

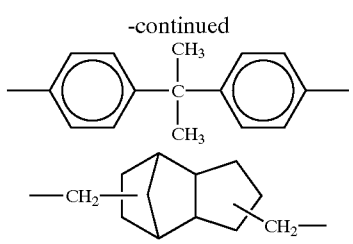

The hydrocarbon group may have an ether linkage in the main chain. The hydrocarbon group having an ether linkage has preferably 4 to 24, more preferably 4 to 18 carbon atoms.

Examples of the hydrocarbon group having an ether linkage include —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$— and the groups shown below:

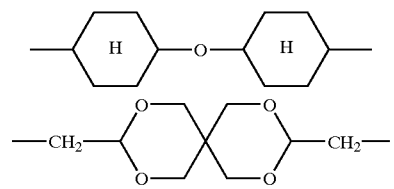

In the formula (S-IV), $R^8$ is an aliphatic group having preferably 3 to 24, more preferably 3 to 17 carbon atoms.

Examples of the aliphatic group include n-propyl, 1-hydroxyethyl, 1-ethylpentyl, n-undecyl, pentadecyl, 8,9-epoxyheptadecyl, cyclopropyl, cyclohexyl and 4-methylcyclohexyl.

In the formula (S-IV), f is an-integer of preferably 1 to 4, more preferably 1 to 3.

In the formula (S-IV), $R^9$ preferably is an f-valent hydrocarbon group having 2 to 24 carbon atoms, more preferably an f-valent hydrocarbon group having 2 to 18 carbon atoms. The hydrocarbon group may have an ether linkage in the main chain. The hydrocarbon group having an ether linkage has preferably 4 to 24, more preferably 4 to 18 carbon atoms.

Examples of the hydrocarbon group and that having an ether linkage are the same as those described above for $R^7$.

In the formula (S-V), g is an integer.of preferably 2 to 4, more preferably 2 or 3.

In the formula (S-V), $R^{10}$ preferably is a g-valent aliphatic group.

Examples of the aliphatic group include —CH$_2$—, —(CH$_2$)$_2$—, —(CH$_2$)$_4$—, —(CH$_2$)$_7$—, —(CH$_2$)$_8$— and the groups shown below:

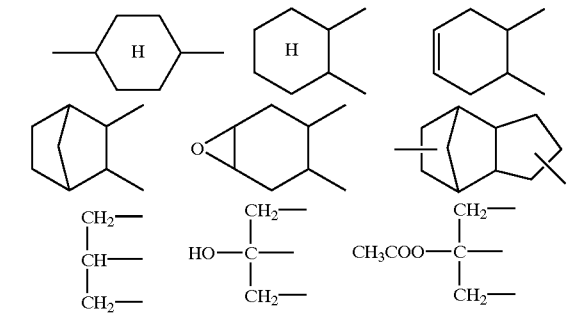

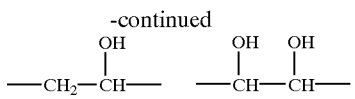

In the formula (S-V), $R^{11}$ preferably is an aliphatic group having preferably 4 to 24 or an aryl group having 6 to 24 carbon atoms, more preferably is an aliphatic group having preferably 4 to 18 or an aryl group having 6 to 18 carbon atoms.

Examples of the aliphatic group and the aryl group are the same as those described above for $R^4$.

In the formula (S-VI), $R^{12}$ preferably is an aliphatic group having 3 to 20 or an aryl group having 6 to 24 carbon atoms, more preferably is an aliphatic group having 3 to 18 or an aryl group having 6 to 18 carbon atoms.

Examples of the aliphatic group include n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl and 4-methylcyclohexyl.

Examples of the aryl group are the same as those described above for Ar.

In the formula (S-VI), each of $R^{13}$ and $R^{14}$ preferably is independently an aliphatic group having 3 to 24 carbon atoms or an aryl group having 6 to 18 carbon atoms, and more preferably is an aliphatic group having 3 to 18 carbon atoms or an aryl group having 6 to 15 carbon atoms.

Examples of the aliphatic group include isopropyl, n-butyl, n-hexyl, 2-ethylhexyl, n-dodecyl, cyclopentyl and cyclopropyl.

Examples of the aryl group include phenyl, 1-naphthyl and p-tolyl.

In the formula (S-VI), the ring formed by combining $R^{13}$ and $R^{14}$ is preferably pyrrolidine ring, piperidine ring or morpholine ring.

In the formula (S-VI), the ring formed by combining $R^{12}$ and $R^{13}$ is preferably pyrrolidine ring.

In the formula (S-VI), X is preferably —CO—.

In the formula (S-VII), $R^{15}$ preferably is an aliphatic group having 3 to 24 carbon atoms, an alkoxycarbonyl group having 5 to 24 carbon atoms, an alkylsulfonyl group having 3 to 24 carbon atoms, an arylsulfonyl group having 6 to 30 carbon atoms, an aryl group having 6 to 32 carbon atoms or cyano; more preferably is an aliphatic group having 3 to 18 carbon atoms, an alkoxycarbonyl group having 5 to 17 carbon atoms, an alkylsulfonyl group having 3 to 18 carbon atoms, an arylsulfonyl group having 6 to 24 carbon atoms, an aryl group having 6 to 24 carbon atoms or cyano.

Examples of the aliphatic group include isopropyl, t-butyl, t-pentyl, t-hexyl, t-octyl, 2-butyl, 2-butyl, 2-hexyl, 2-octyl, 2-dodecyl, 2-hexadecyl, t-pentadecyl, cyclopentyl and cyclopropyl.

Examples of the alkoxycarbonyl group include n-butoxycarbonyl, 2-ethylhexyloxycarbonyl and n-dodecyloxycarbonyl.

Examples of the alkylsulfonyl group include n-butylsulfonyl and n-dodecylsulfonyl.

Examples of the arylsulfonyl group include p-tolylsulfonyl, p-dodecylphenylsulfonyl and p-hexadecyloxyphenylsulfonyl.

Examples of the aryl group include phenyl and p-tolyl.

In the formula (S-VII), $R^{16}$ preferably is a halogen atom, an alkyl group having 3 to 24 carbon atoms, a cycloalkyl group having 5 to 17 carbon atoms, an aryl group having 6 to 32 carbon atoms, an alkoxy group having 1 to 24 carbon atoms or an aryloxy group having 6 to 32 carbon atoms; more preferably is chlorine atom, an alkyl group having 3 to 18 carbon atoms, a cycloalkyl group having 5 to 15 carbon atoms, an aryl group having 6 to 24 carbon atoms, an alkoxy group having 1 to 18 carbon atoms or an aryloxy group having 6 to 24 carbon atoms.

Examples of the alkyl group are the same as those described above for $R^{15}$.

Examples of the cycloalkyl group include cyclopentyl and cyclohexyl.

Examples of the-aryl group include phenyl and p-tolyl.

Examples of the alkoxy group include methoxy, n-butoxy, 2-ethylhexyloxy, benzyloxy, n-dodecyloxy and n-hexadecyloxy.

Examples of the aryloxy group include phenoxy, p-t-butylphenoxy, p-t-octylphenoxy, m-pentadecylphenoxy and p-dodecyloxyphenoxy.

In the formula (S-VII), h is preferably an integer of 1 or 2.

In the formula (S-VIII), each of $R^{17}$ and $R^{18}$ preferably is independently an aliphatic group having 3 to 24 carbon atoms or an aryl group having 6 to 18 carbon atoms, and more preferably is an aliphatic group having 3 to 18 carbon atoms or an aryl group having 6 to 15 carbon atoms.

Examples of the aliphatic group and the aryl group are the same as those described-above for $R^{13}$ and $R^{14}$.

In the formula (S-VIII), $R^{19}$ preferably is a halogen atom, an alkyl group having 3 to 24 carbon atoms, a cycloalkyl group having 5 to 17 carbon atoms, an aryl group having 6 to 32 carbon atoms, an alkoxy group having 1 to 24 carbon atoms or an aryloxy group having 6 to 32 carbon atoms; more preferably is chlorine atom, an alkyl group having 3 to 18 carbon atoms, a cycloalkyl group having 5 to 15 carbon atoms, an aryl group having 6 to 24 carbon atoms, an alkoxy group having 1 to 18 carbon atoms or an aryloxy group having 6 to 24 carbon atoms.

Examples of the alkyl group, the cycloalkyl group, the aryl group, the alkoxy group and the aryloxy group are the same as those described above for $R^{15}$ or $R^{16}$.

In the formula (S-IX), each of $R^{20}$ and $R^{21}$ preferably is independently an aliphatic group having 3 to 24 carbon atoms or an aryl group having 6 to 24 carbon atoms, and more preferably is an aliphatic group having 4 to 18 carbon atoms or an aryl group having 6 to 18 carbon atoms.

Examples of the aliphatic group and the aryl group are the same as those described above for $R^1$, $R^2$ and $R^3$.

In the formula (S-IX), j is preferably 1.

Examples of the high boiling point organic solvents represented by the formula (S-I) are shown below:

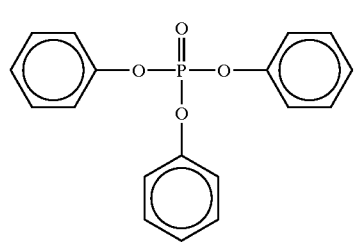

s-1

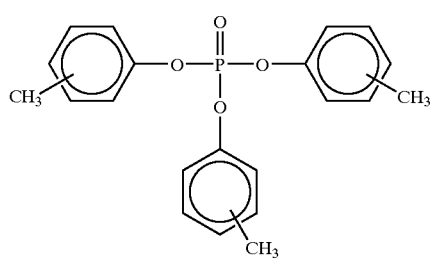
s-2
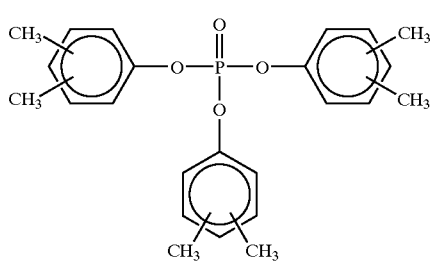
s-3
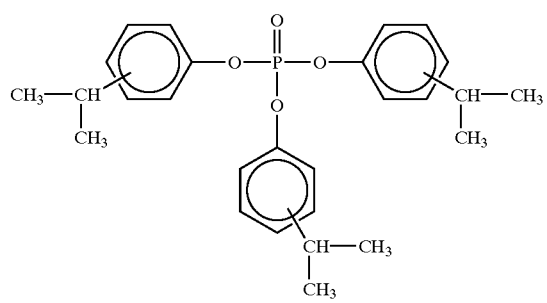
s-4
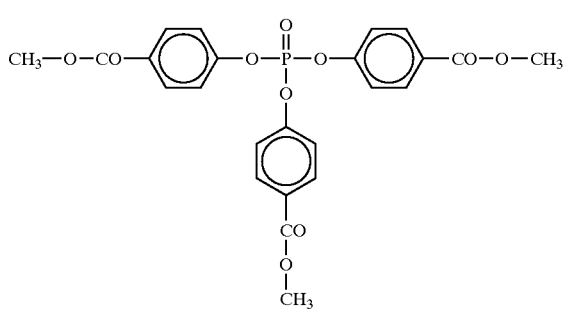
s-5
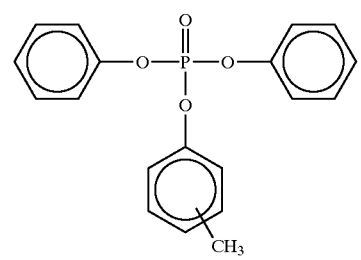
s-6
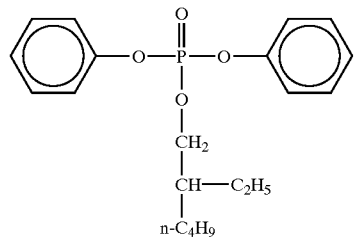
s-7
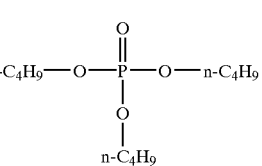
s-8
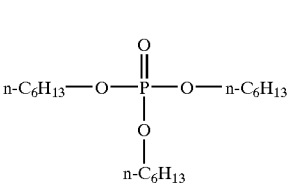
s-9
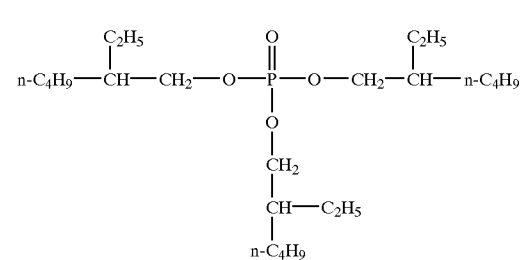
s-10
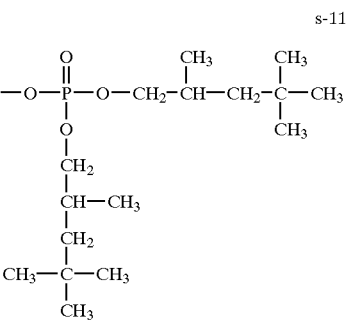
s-11
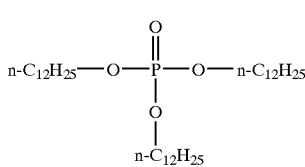
s-12
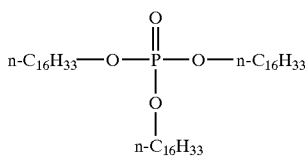
s-13

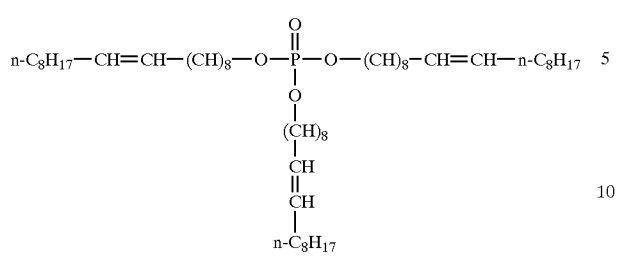
s-14
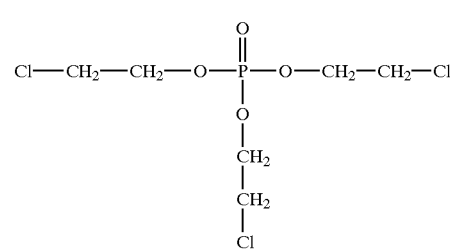
s-15
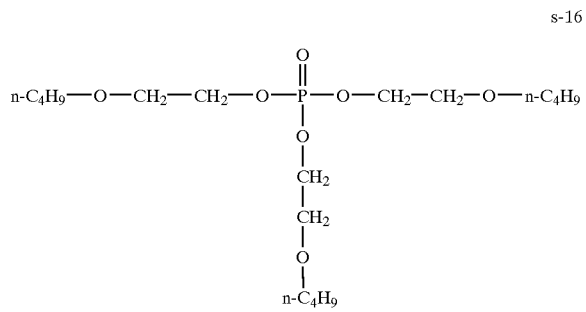
s-16
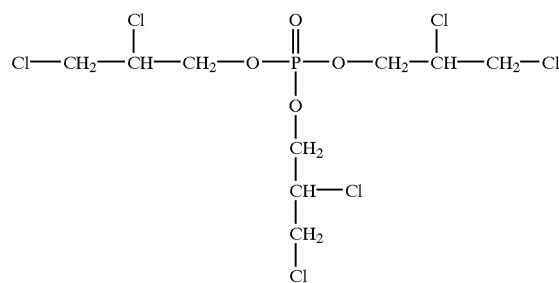
s-17
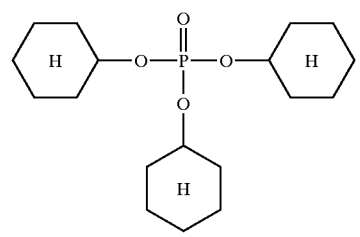
s-18
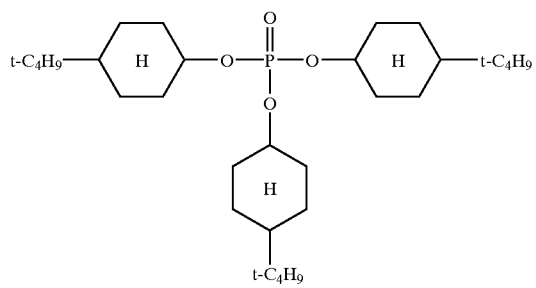
s-19
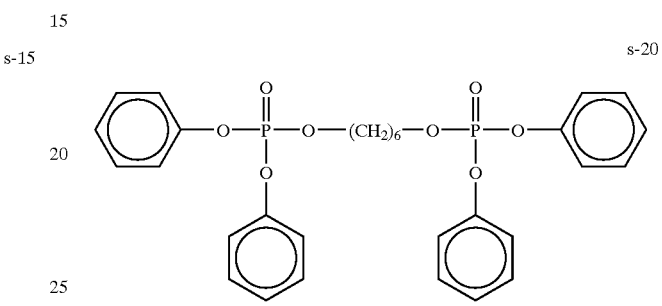
s-20
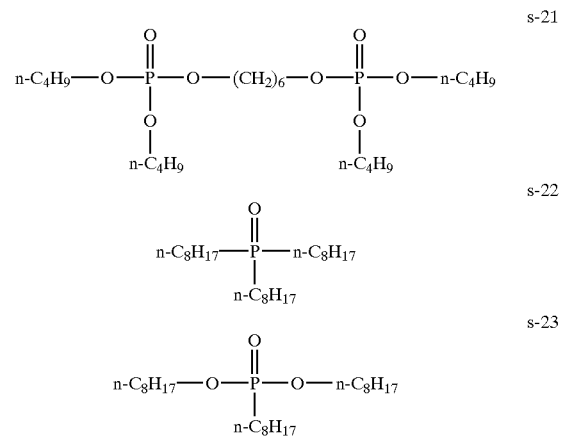
s-21
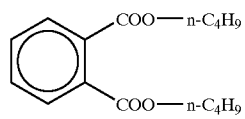
s-22
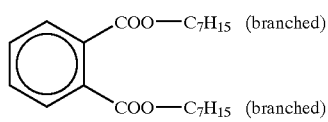
s-23
Examples of the high boiling point organic solvents represented by the formula (S-II) are shown below:
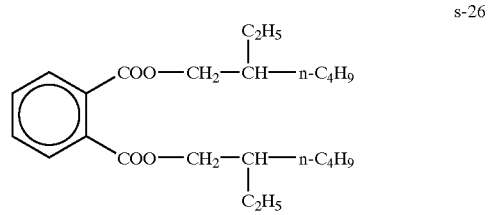
s-24, s-25, s-26 s-27
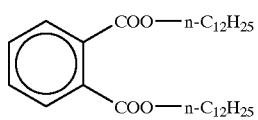
s-28
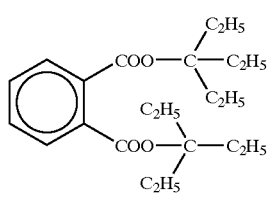
s-29
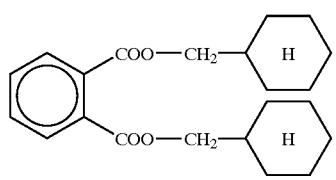
s-30
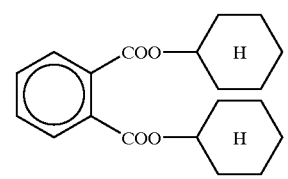
s-31
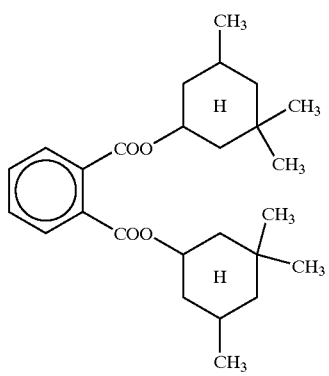
s-32
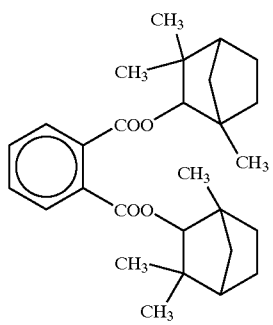
s-33
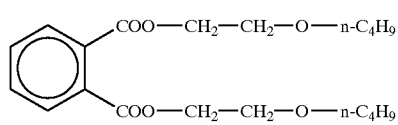
s-34
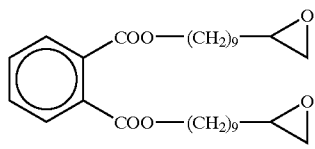
s-35
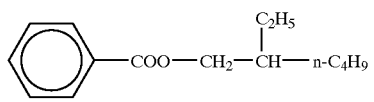
s-36
s-37
s-38
s-39
Examples of the high boiling point organic solvents represented by the formula (S-III) are shown below:
s-40
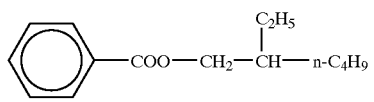
s-41
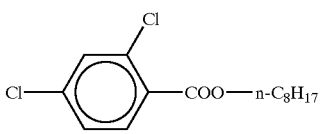
s-42
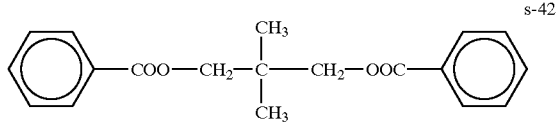
s-43
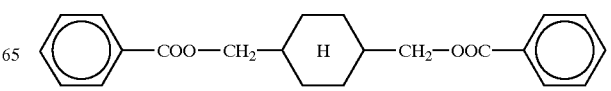

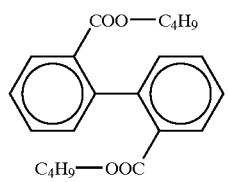
s-44
Examples of the high boiling point organic solvents represented by the formula (S-IV) are shown below:
s-45
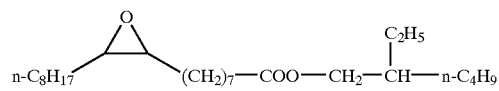
s-46
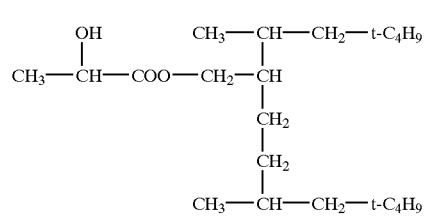
s-47
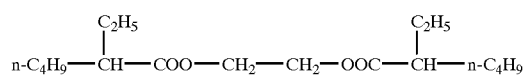
s-48
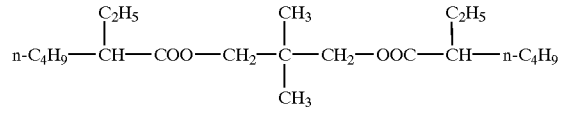
s-49
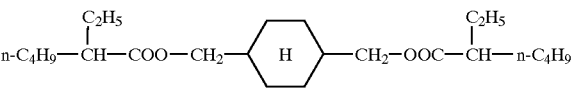
s-50
Examples of the high boiling point organic solvents represented by the formula (S-V) are shown below:
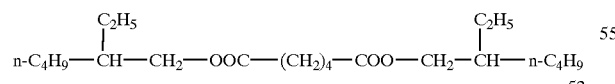
s-51
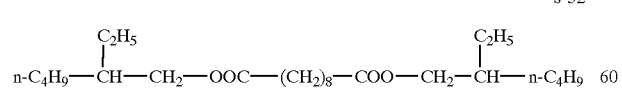
s-52
n-C$_4$H$_9$—OOC—(CH$_2$)$_8$—COO—n-C$_4$H$_9$
s-53
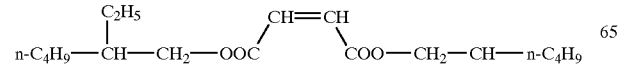
s-54
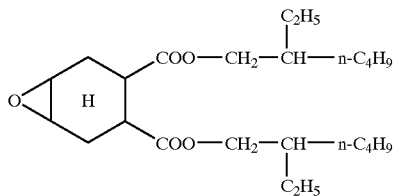
s-55
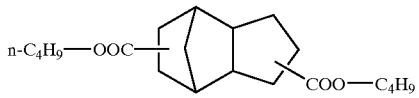
s-56
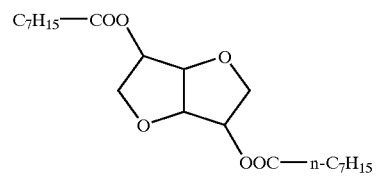
s-57
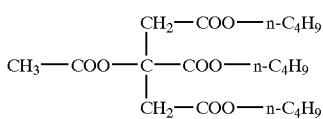
s-58
Examples of the high boiling point organic solvents represented by the formula (S-VI) are shown below:
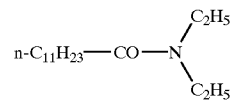
s-59
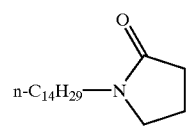
s-60
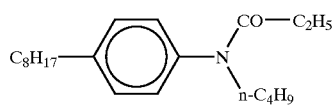
s-61
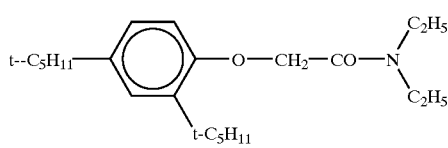
s-62
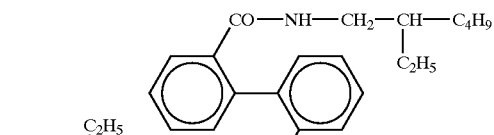
s-63
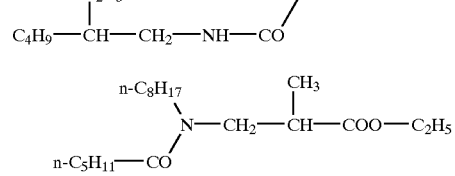
s-64

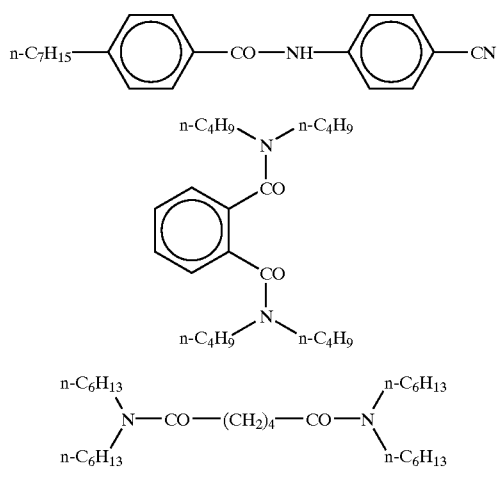
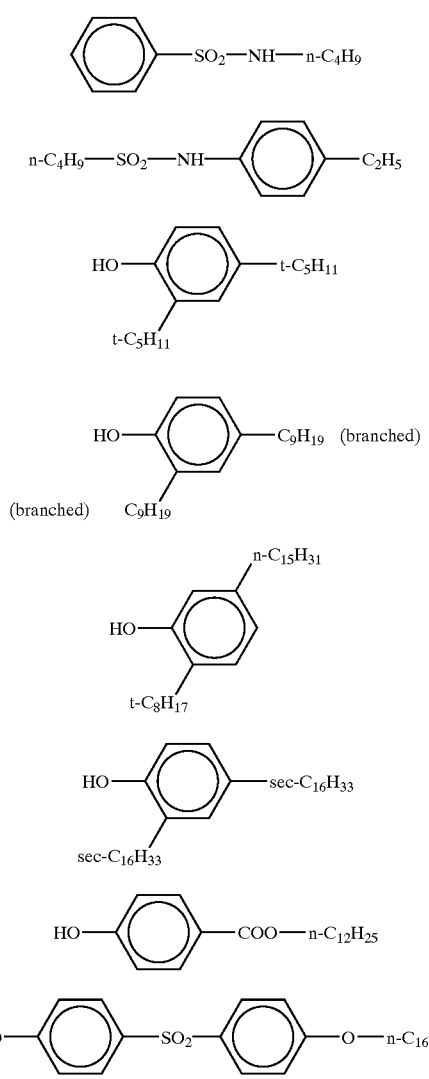

Examples of the high boiling point organic solvents represented by the formula (S-VII) are shown below:

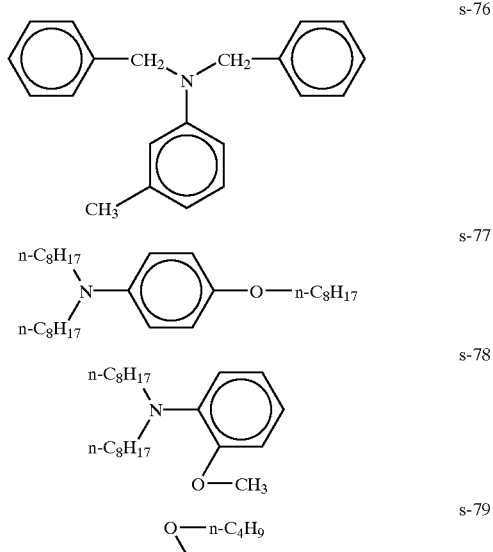

Examples of the high boiling point organic solvents represented by the formula (S-VIII) are shown below:

Examples of the high boiling point organic solvents represented by the formula (S-IX) are shown below:

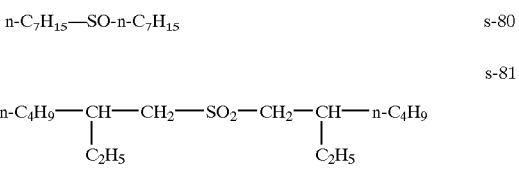

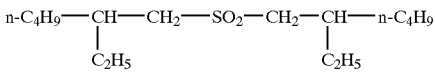

Two or more solvents having high boiling points can be used in combination. Examples of the combination of the solvents include a combination of tricresylphosphate and dibutylphthalate, a combination of trioctylphosphate and di(2-ethylhexyl)sebacate, and a combination of dibutylphthalate and poly(N-t-butylacrylamide).

The oil phase contains the organic solvent preferably in amount of 0.1 to 10 weight parts, more preferably in an amount of 0.5 to 4 weight parts based on 1 weight part of the dye.

The organic solvent having a high boiling point can be prepared according to U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639; European Patent Nos. 276,319 A, 286,253 A, 289,820 A, 309,158 A, 309,159 A, 309,160 A, 509,311 A and 510,576 A; East German Patent Nos. 147,009, 157,147, 159,573, and 225,240 A; British Patent No. 2,091,124 A; and Japanese Patent Provisional Publication Nos. 48(1973)-47335, 50(1975)-26530, 51(1976)-25133, 51(1976)-26036, 51(1976)-27921, 51(1976)-27922, 51(1976)-149028, 52(1977)-46816, 53(1978)-1520, 53(1978)-1521, 53(1978)-

15127, 53(1978)-146622, 54(1979)-91325, 54(1979)-106228, 54(1979)-118246, 55(1980)-59464, 56(1981)-64333, 56(1981)-81836, 59(1984)-204041, 61(1986)-84641, 62(1987)-118345, 62(1987)-247364, 63(1988)-167357, 63(1988)-214744, 63(1988)-301941, 64(1989)-9452, 64(1989)-9454, 64(1989)-68745, 1(1989)-101543, 1(1989)-102454, 2(1990)-792, 2(1990)-4239, 2(1990)-43541, 4(1992)-29237 and 4(1992)-30165, 4(1992)-232946, 4(1992)-346338.

The oil phase can contain a low boiling point organic solvent in addition to the high boiling point organic solvent.

The low boiling point organic solvent has a boiling point preferably in the range of 30° C. to 150° C., more preferably in the range 30° C. to 100° C., and most preferably in the range of 30° C. to 80° C. Examples of the low boiling point organic solvents include an ester (e.g., ethyl acetate, butyl acetate, ethyl propionate, β-ethoxyethyl acetate, methylcellosolve acetate), an alcohol (e.g., isopropyl alcohol, n-butyl alcohol, sec-butyl alcohol), a ketone (e.g., methyl isobutyl ketone, methyl ethyl ketone, cyclohexanone), an amide (e.g., dimethylformamide, N-methylpyrrolidone) and an ether (e.g., tetrahydrofuran, dioxane).

The oil phase comprises the low boiling point organic solvent preferably in an amount of 1 to 20 volume parts, more preferably in an amount of 2 to 10 volume parts, and most preferably-in an amount of 2 to 5 volume parts, based on 1 volume part of the dye and the high boiling point organic solvent.

The oil phase comprises the low-boiling point organic solvent preferably in an amount of 0.05 to 1 volume part, more preferably in an amount of 0.05 to 0.5 volume part, and most preferably in an amount of 0.08 to 0.3 volume part, based on 1 volume part of the aqueous medium.

The ink composition is obtained by the steps of dissolving the dye in a high boiling point organic solvent containing to prepare an oil phase and emulsifying the oil phase in an aqueous solvent (aqueous phase).

The aqueous phase or oil phase can contain additives such as a surfactant, a wetting agent, a dye-stabilizing agent, an antiseptic and an anti-mildew agent.

In the emulsifying process, the oil phase is generally added into the aqueous phase. However, the aqueous phase may be added into the oil phase (i.e., phase inversion emulsification).

Surfactants can be used for emulsifying. Anionic or nonionic surfactants are preferably used. Examples of the anionic surfactants include fatty acid salts, alkyl sulfates, alkylbenzene sulfonates, alkylnaphthalene sulfonates, dialkyl sulfosuccinate, alkyl phosphates, naphthalene sulfonic acid-formalin condensation product and polyoxyethylenealkylsulfates. Examples of the nonionic surfactants include polyoxyethylene ethers, polyoxyethylenealkylaryl ethers, polyoxyethylene fatty acid esters, sorbitan fatty acid esters, polyoxyethylene sorbitan fatty acid esters, polyoxyethylene alkylamines, glycerin fatty acid esters and oxyethyleneoxypropylene block copolymer.

Further, acetylenic polyoxyethyleneoxide surfactants (e.g., SURFYNOLS, Air Product & Chemicals) may be used. Amphoteric surfactants of amine oxide type (e.g., N,N-dimethyl-N-alkylamine oxide) are also usable. The surfactants are described in Japanese Patent Provisional Publication No. 59(1984)-157636 (pp. 37–38) and Research Disclosure No. 308119 (1989).

Water-soluble polymers can be added besides the surfactants. Water-soluble polymers stabilize the emulsion. Examples of the water-soluble polymers include polyvinyl alcohol, polyvinyl pyrrolidone, polyethylene oxide, polyacrylic acid, polyacrylamide and copolymers thereof. Natural water-soluble polymers such as polysaccharide (e.g., starch) and proteins (e.g., casein, gelatin) are also usable.

Water-dispersed (self-emulsifying) polymers can be also added. Those can stabilize the emulsion. Water-dispersed (self-emulsifying) polymers can be categorized into three types: ion-dissociation type, nonionic dispersing group-containing type and hybrid type. Examples of the ion-dissociation type polymers include polymers having cationic dissociation groups (e.g., tertiary amino) and polymers having anionic dissociation groups (e.g., carboxyl, sulfo). Examples of the nonionic dispersing group-containing polymers include polymers having nonionic dissociation groups (e.g., polyethyleneoxy group). Preferred are polymers having anionic dissociation groups, nonionic dispersing group-containing polymers or hybrid polymers thereof.

Droplets of the emulsified oil phase have a volumetric average diameter of not larger than 100 nm, and more preferably in the range of 1 to 50 nm.

The volumetric average diameter can be measured by known methods. For example, the ink composition is diluted with distilled water so that the concentration of dye may be in the range of 0.1 to 1 wt. %, and then the average diameter is measured by means of a commercially available apparatus (e.g., Microtruck UPA, Nikkiso Co.,. Ltd.).

It is preferred that the number of oil drops having a diameter of not smaller than 5 μm be at most 10 per 1 μl of ink, and further that the number of oil drops having a diameter not smaller than 1 μm be at most 1,000 per 1 μl of ink.

Relatively large oil drops can be removed by centrifugation or precision filtration, which can be performed at any step between the step of preparing the emulsion and the step of charging an ink cartridge.

If a mechanical emulsifying apparatus is used, the average diameter of oil drops is made small and the number of relatively large oil drops is reduced.

The emulsification can be performed by a stirring mixer, an impeller mixer, an in-line mixer, a mill (e.g., colloid mill), an ultrasonic mixer or a high-pressure homogenizer. A high-pressure homogenizer is preferred.

A high-pressure homogenizer is described in U.S. Pat. No. 4,533,254 and Japanese Patent Provisional Publication No. 6(1994)-47264. Commercially available high-pressure homogenizers (e.g., Gaulin homogenizer, A.P.V GAULIN INC.; Microfluidizer, MICROFLUIDEX INC.; Altimizer, SUGINO MACHINE CO., LTD.) can be used. It is particularly preferred to use a high-pressure homogenizer with super high-pressure jet flow (described in U.S. Pat. No. 5,720,551). A commercially available emulsifying apparatus with super high-pressure jet flow (DeBEE 2000, BEE INTERNATIONAL LTD.) is also usable.

The pressure in the emulsification with a high-pressure dispersing apparatus is preferably not lower than 50 MPa, more preferably not lower than 60 MPa, and most preferably not lower than 180 MPa. The pressure is preferably not higher than 320 Mpa, and more preferably not higher than 200 MPa.

Two or more emulsifying apparatuses can be used in combination. Preferably, after emulsified by an emulsifying apparatus, the composition is further emulsified by a high-pressure homogenizer. Additives such as a surfactant and a wetting agent can be added between the emulsification by the emulsifying apparatus and that by the high-pressure homogenizer.

If the oil phase contains a low boiling point organic solvent as well as a high boiling point organic solvent, the low boiling point solvent is preferably removed after emulsification. The low boiling point organic solvent can be removed by heating evaporation, vacuum evaporation or ultra filtration, and is preferably removed immediately after emulsification.

Additives such as a drying retarder, a penetration promoter, an ultraviolet absorbing agent, an oxidation inhibitor, a viscosity adjusting agent, a surface tension adjuster, an emulsifier, an emulsion stabilizing agent, an antiseptic, an anti-corrosive agent, a pH adjuster, a defoaming agent and a chelating agent can be optionally added to the jet-printing ink.

As the drying retarder, a water-soluble organic solvent having a vapor pressure lower than water vapor pressure is preferably used. Examples of the water-soluble organic solvent include polyvalent alcohols (e.g., ethylene glycol, propylene glycol, diethylene glycol, polyethylene glycol, thiodiglycol, dithiodiglycol, 2-methyl-1,3-propane-diol, 1,2,6-hexanetriol, acetylene glycol derivatives, glycerin, trimethylolpropane), lower alkyl ethers of polyvalent alcohols (e.g., ethylene glycol monomethyl ether, ethylene glycol monoethyl ether, diethylene glycol monomethyl ether, diethylene glycol monoethyl ether, triethylene glycol monoethyl ether, triethylene glycol monobutyl ether), heterocyclic compounds (e.g., 2-pyrrolidone, N-methyl-2-pyrrolidone, 1,3-dimethyl-2-imidazolidinone, N-ethylmorpholine), sulfur-containing compounds (e.g., sulfolane, dimethyl sulfoxide, 3-sulfolene), poly-functional compounds (e.g., diacetone alcohol, diethanolamine) and urea derivatives. Particularly preferred are polyvalent alcohols. Two or more drying retarders can be used in combination. The jet printing ink preferably contains the drying retarder in an amount of 10 to 50 wt. %.

Examples of the penetration promoter include alcohols (e.g., ethanol, isopropanol, butanol, diethyleneglycol monobutyl ether, triethyleneglycol monobutyl ether, 1,2-hexanediol), sulfuric ester salts (e.g., sodium lauryl sulfate), fatty acid salts (e.g., sodium oleate) and nonionic surfactants. The jet printing ink preferably contains the penetration promoter in an amount of 10 to 30 wt. %.

Examples of the ultraviolet absorbing agent include benzotriazole compounds (described in Japanese Patent Provisional Publication Nos. 58(1983)-185677, 61(1986)-190537, 2(1990)-782, 5(1993)-197075 and 9(1997)-34057), benzophenone compounds (described in Japanese Patent Provisional Publication Nos. 46(1971)-2784 and 5(1993)-194483; and U.S. Pat. No. 3,214,463), cinnamate compounds (described in Japanese Patent Publication Nos. 48(1973)-30492 and 56(1981)-21141, and Japanese Patent Provisional Publication No. 10(1998)-88106), and triazine compounds (described in Japanese Patent Provisional Publication Nos. 4(1992)-298503, 8(1996)-53427, 8(1996)-239368 and 10(1998)-182621, and Japanese Patent Publication No. 8(1996)-501291). The ultraviolet absorbing agent is described in Research Disclosure No. 24239. A brightening agent, which absorbs ultraviolet rays to emit luminescence, is also usable. Examples of the brightening agent include stilbene compounds and benzoxazole compounds.

As the oxidation inhibitor, organic compounds or metal complex compounds known as anti-fading agents can be used. Examples of the organic anti-fading agents include hydroquinone compounds, alkoxyphenol compounds, dialkoxyphenol compounds, phenol compounds, aniline compounds, amine compounds, indane compounds, chroman compounds, alkoxyaniline compounds and heterocyclic compounds. Examples of the metal complex anti-fading agents include nickel complexes and zinc complexes. The oxidation inhibitor is described in Research Disclosure Nos. 17643 (Chapter VII, Section I and J), 15162, 18716 (pp.650), 36544 (pp.527), 307105 (pp.872) and 15162; and Japanese Patent Provisional Publication No. 62(1987)-215272 (pp.127 to 137).

Examples of the anti-mildew agent include sodium dihydroacetate, sodium benzoate, sodium pyridinethione-1-oxide, ethyl p-hydroxybenzoate, 1,2-benzisothiazoline-3-one and a salt thereof. The jet printing ink preferably contains the anti-mildew agent in an amount of 0.02 to 1.00 wt. %.

Examples of the pH adjuster include alkali metal hydroxides (e.g., lithium hydroxide, potassium hydroxide), carbonates (e.g., sodium carbonate, sodium hydrogencarbonate), carboxylates (e.g., potassium acetate), inorganic salts (e.g., sodium silicate, disodium silicate) and organic bases (e.g., N-methyldiethanolamine, triethanolamine). The pH value of the jet printing ink is adjusted in the range of preferably 6 to 10, more preferably 7 to 10.

Examples of the surface tension adjuster include nonionic surfactants, cationic surfactants and anionic surfactants. These surfactants preferably have aqueous solubilities at 25° C. in the range of not less than 0.5 wt. %.

The surface tension of the jet printing ink is adjusted in the range of preferably 20 to 60 mN/m, more preferably 25 to 45 mN/m.

The viscosity of the jet printing ink (not the viscosity of the oil phase alone but the total viscosity) is in the range of preferably not more than 30 mPa·s, more preferably not more than 20 mPa·s.

Examples of the emulsifier or the emulsion stabilizing agent include nonionic surfactants, cationic surfactants and anionic surfactants.

Examples of the defoaming agent include fluorine compounds, silicone compounds and chelating agents (e.g., EDTA).

The additives are added to the oil phase, the aqueous phase or (after emulsification) the emulsion. Normally, the additives are added into the emulsion.

Examples of image-receiving material for ink-jet recording include ordinary paper, resin-coated paper, paper specialized in ink-jet printing (described in Japanese Patent Provisional Publication Nos. 62(1987)-238783, 2(1990)-276670, 7(1995)-276789, 8(1996)-169172, 8(1996)-27693, 9(1997)-323475, 10(1998)-153989, 10(1998)-217473, 10(1998)-217597, 10(1998)-235995 and 10(1998)-337947), film, electrophotographic paper, cloth, and a sheet of glass, metal and ceramics.

The image-receiving material preferably has a support made of paper. The paper support is made from chemical pulp (e.g., LBKP, NBKP), mechanical pulp (e.g., GP, PGW, RMP, TMP, CTMP, CMP, CGP) or waste paper pulp (e.g., DIP), and if needed, additives (e.g., pigment, binder, sizing agent, fixer, cation agent, reinforcing agent) by means of a paper machine (e.g., long-net paper machine, cylindrical paper machine).

The support may be made of synthetic paper or plastic. The thickness of the support is preferably in the range of 10 to 250 μm.

The weight of the paper support is preferably in the range of 10 to 250 g/m².

The image-receiving material preferably has an image-receiving layer provided on the support. More preferably, the image-receiving layer contains inorganic white pigment particles. Further, a back-coating layer may be provided on the support.

After press-sizing the paper support, the image-receiving layer and/or the back-coating layer may be provided. Hydrophilic polymers (e.g., starch, polyvinyl alcohol) are used for press-sizing.

An anchor coating layer may be provided between the support and the image-receiving layer or the back-coating layer.

The above-described layers may be formed after the paper support is subjected to calendering treatment, which can be performed by a calender machine (e.g., machine calender, TG calender, soft calender).

Further, films of polyolefin (e.g., polyethylene, polystyrene, polyethylene terephthalate, polybutene and copolymers thereof) may be laminated on both surfaces of a sheet of paper or plastics. That sheet is preferably used as the support. White pigments (e.g., titanium oxide, zinc oxide) or coloring dyes (e.g., cobalt blue, ultramarine, neodymium oxide) may be incorporated in the polyolefin.

The image-receiving layer generally contains pigments and an aqueous binder.

As the pigments, white pigments are preferred and inorganic white pigments are particularly preferred.

Examples of the inorganic white pigments include calcium carbonate, kaolin, talc, clay, diatomaceous earth, synthesized amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate.

The inorganic white pigments are preferably porous. Synthesized amorphous silica having large porous area is preferably used. Examples of the synthesized amorphous silica include silicic acid anhydride obtained by a dry process and silicic acid hydrate obtained by a wet process. Silicic acid hydrate is particularly preferred.

Organic white pigments can be used in combination with the inorganic white pigments. Examples of the organic white pigments include styrene pigments, acrylic pigments, urea resin and melamine resin.

Examples of the aqueous binder in the image-receiving layer include water-soluble polymers (e.g., polyvinyl alcohol, silanol-denatured polyvinyl alcohol, starch, cationized starch, casein, carboxymethyl cellulose, hydroxyethyl cellulose, polyvinyl pyrrolidone, polyalkylene oxide, polyalkylene oxide derivatives) and water-dispersible polymers (e.g., styrene-butadiene latex, acryl emulsion). Preferred are polyvinyl alcohol and silanol-denatured polyvinyl alcohol. Two or more aqueous binders can be used in combination.

The image-receiving layer can further contain additives such as a mordant, a water-proofing agent, a light resistance improving agent and a surfactant, as well as the pigments and the aqueous binder.

The mordant incorporated in the image-receiving layer is preferably passivated, and hence a polymer mordant is preferably used.

The polymer mordant is described in Japanese Patent Provisional Publication Nos. 48(1973)-28325, 54(1979)-74430, 54(1979)-124726, 55(1980)-22766, 55(1980)-142339, 60(1985)-23850, 60(1985)-23851, 60(1985)-23852, 60(1985)-23853, 60(1985)-57836, 60(1985)-60643, 60(1985)-118834, 60(1985)-122940, 60(1985)-122941, 60(1985)-122942, 60(1985)-235134 and 1(1989)-161236; and U.S. Pat. Nos. 2,484,430, 2,548,564, 3,148,061, 3,309,690, 4,115,124, 4,124,386, 4,193,800, 4,273,853, 4,282,305 and 4,450,224. The polymer mordant described in Japanese Patent Provisional Publication No. 1(1989)-161236 (pp.212-215) is particularly preferred. That polymer mordant gives an image of high quality, and further improves the light resistance of the image.

As the water-proofing agent, cationic resins are preferably used. Examples of the cationic resins include polyamide-polyamine epichlorohydrin, polyethyleneimine, polyaminesulfone, dimethyldiallylammonium chloride polymer, cationpolyacrylic amide and colloidal silica. Particularly preferred is polyamidepolyamine epichlorohydrin. The cationic resin is incorporated in an amount of preferably 1 to 15 wt. %, more preferably 3 to 10 wt. % based on the solid content of the image-receiving layer.

Examples of the light resistance improving agent include zinc sulfate, zinc oxide, hinder amine oxidation inhibitor and benzotriazole ultraviolet absorber (e.g., benzophenone). Particularly preferred is zinc sulfate.

The surfactant functions as a coating aid, a releasing agent, a slipping improver or an antistatic. The surfactant is described in Japanese Patent Provisional Publication Nos. 62(1987)-173463 and 62(1987)-183457.

Organic fluoro compounds can be used in place of the surfactants. The organic fluoro compounds are preferably hydrophobic. Examples of the organic fluoro compounds include fluorine-containing surfactants, oily fluorine-containing compounds (e.g., fluorine oil) and solid fluorine-containing compound resins (e.g., tetrafluoroethylene resin). The organic fluoro compounds are described in Japanese Patent Publication No. 57(1982)-9053 and Japanese Patent Provisional Publication Nos. 61(1986)-20994 and 62(1987)-135826.

The image-receiving layer may furthermore contain a pigment-dispersing agent, a thicker, a defoaming agent, a dye, a brightening agent, an antiseptic, a pH adjuster, a matting agent and a film-hardening agent.

Two or more image-receiving layers may be provided.

The back-coating layer may contain white pigments or an aqueous binder.

Examples of the inorganic white pigments include light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthesized amorphous silica, colloidal silica, colloidal alumina, pseudo-boehmite, aluminum hydroxide, alumina, lithopone, zeolite, hydrated halloysite, magnesium carbonate and magnesium hydroxide. Examples of the organic white pigments include styrene pigments, acrylic pigments, polyethylene pigment, microcapsulate pigments, urea resin and melamine resin.

Examples of the aqueous binder include water-soluble polymers (e.g., polystyrene, polymaleates, polyacrylates, polyvinyl alcohol, silanol-denatured polyvinyl alcohol, starch, cationized starch, casein, gelatin, carboxymethyl cellulose, hydroxyethyl cellulose, polyvinyl pyrrolidone, copolymers thereof such as styrene/maleate copolymer and styrene/acrylate copolymer) and water-dispersible polymers (e.g., styrene-butadiene latex, acryl emulsion).

The back-coating layer can further contain a defoaming agent, a foaming inhibitor, a dye, a brightening agent, an antiseptic or a water-proofing agent.

A polymer latex may be incorporated in layers composing the image-receiving material to improve the characteristics of the layer (e.g., for size-stabilizing and for inhibiting curling, adhesion or cracks of the layer). The polymer latex is described in Japanese Patent Provisional Publication Nos. 62(1987)-245258, 62(1987)-1316648 and 62(1987)-110066. If a polymer latex having a low glass transition point (not higher than 40° C.) is added in a layer containing a mordant, the polymer latex effectively prevents the layer from cracking and curling. Even if a polymer latex having a high glass transition point is added in the back-coating layer, the polymer latex also prevents the material from curling.

The ink-jet recording can be carried out-according to known methods, which include: charge-controlling method, in which ink drops are jetted out by electrostatic attraction; drop-on-demand (pressure pulse) method, in which vibration pressure of a piezoelectric device is used; acoustic ink-jet method, in which electric signals are converted into acoustic beams, and the beams are applied onto ink to induce radiation pressure by which ink drops are jetted out; and thermal ink-jet method, in which ink is heated to form babbles, and the babbles cause pressure by which ink drops are jetted out. Further, the known methods include a method in which many small drops of thin ink (so-called photo-ink) are jetted out, a method in which plural inks having essentially the same color but different concentrations are used to improve the image quality, and a method in which a colorless transparent ink is used.

EXAMPLE 1

A mixed solvent was prepared by mixing 6 g of a high boiling point organic solvent (s-2), 10 g of another high boiling point organic solvent (s-11) and 50 ml of ethyl acetate. In the solvent, 8 g of an oleaginous dye (d-7) and 5 g of sodium dioctylsulfosuccinate are added and dissolved at 70° C.

To the obtained-solution (oil phase), 500 ml of deionized water (aqueous phase) was added and stirred with a magnetic stirrer. Thus, an emulsion of O/W type was prepared.

The emulsion was made to pass through a high-pressure homogenizer (Microfluidizer, MICROFLUIDEX INC.) at 60 MPa five times to be further finely emulsified. From the obtained emulsion, the solvent having a low boiling point was removed by a rotary evaporator until ethyl acetate did not smell.

To the resulting emulsion, 130 g of diethylene glycol, 60 g of glycerin, 7.2 g of sodium dioctylsulfosuccinate and 700 ml of deionized water were added to prepare a light magenta ink (Sample 101).

[Preparation of Samples 102 to 107]

The procedure for preparing Sample 101 was repeated except that the dye, the high boiling point organic solvent, the aqueous solution and the surfactant were changed as shown in Table 1, to prepare Samples 102 to 107.

[Preparation of Sample 108]

The procedure for preparing Sample 101 was repeated except that the amounts of the dye and the high boiling point organic solvents were changed as shown in Table 1, and further except that polybutyl methacrylate (weight average molecular weight: 50,000) was incorporated as shown in Table 1. Thus, Sample 108 was prepared.

[Preparation of Sample 109]

The procedure for preparing Sample 101 was repeated except that the amount of the surfactant was changed as shown in Table 1, to prepare Sample 109.

[Preparation of Sample 110]

The procedure for preparing Sample 101 was repeated except that the amount of the dye was changed and the solvent having a high boiling point was omitted as shown in Table 1, and further except that polybutylmethacrylate (weight average molecular weight: 50,000) was incorporated as shown in Table 1. Thus, Sample 110 was prepared.

[Preparation of Sample 111]

A commercially available magenta ink (pigment for outdoor use) [KAREIDA, Fuji Photo film Co., Ltd.] was adopted as Sample 111.

In the Table 1, the items of "Dye", "HB solvent", "Surfactant-1", "LB solvent" and "Aqueous phase-1" indicate ingredients used at the step of emulsification, and the items of "WS solvent", "Surfactant-2" and "Aqueous phase-2" indicate ingredients added after the step of emulsification.

TABLE 1

| Sample No. | 101 | 102 | 103 | 104 | 105 | 106 | 107 | 108 | 109 | 110 | 111 |
|---|---|---|---|---|---|---|---|---|---|---|---|
| Dye | d-7 | d-7 | d-7 | d-7 | d-7 | d-7 | d-7 | d-7 | d-7 | d-7 | KAREIDA magenta ink |
|  | 8 g | 8 g | 2 g | 8 g | 8 g) | 4 g | 4 g | 8 g | 8 g | 6 g |  |
| HB Solvent-1 | s-2 | s-2 | s-2 | s-2 | s-11 | s-59 | s-2 | s-11 | s-2 | PBMA | — |
|  | 6 g | 10 g | 6 g | 6 g | 12 g | 20 g | 20 g | 15 g | 6 g | 18 g |  |
| HB Solvent-2 | s-11 | s-11 | s-11 | s-11 | None | None | None | PBMA | s-11 | None | — |
|  | 10 g | 6 g | 10 g | 10 g |  |  |  | 1 g | 10 g |  |  |
| Surfactant-1 | Surf-1 | Surf-1 | Surf-1 | Surf-1 | Surf-1 | Surf-1 | Surf-1 | Surf-1 | Surf-1 | Surf-1 | — |
|  | 5 g | 5 g | 5 g | 5 g | 5 g | 5 g | 5 g | 5 g | 0.5 g | 5 g |  |
| LB solvent | LB-1 | LB-1 | LB-1 | LB-1 | LB-1 | LB-1 | LB-1 | LB-1 | LB-1 | LB-1 | — |
|  | 50 ml | 50 ml | 50 ml | 50 ml | 50 ml | 50 ml | 50 ml | 50 ml | 50 ml | 50 ml |  |
| Aqueous phase-1 | Water | Water | Water | Water | Water | Water | Water | Water | Water | Water | — |
|  | 500 ml | 500 ml | 500 ml | 500 ml | 500 ml | 500 ml | 500 ml | 500 ml | 500 ml | 500 ml |  |
| Volume* | 304 ml | 296 ml | 307 ml | 304 ml | 298 ml | 313 ml | 312 ml | 312 ml | 303 ml | 298 ml | — |
| WS solvent-1 | WS-1 | WS-1 | WS-1 | None | WS-1 | WS-1 | WS-1 | WS-1 | WS-1 | WS-1 | — |
|  | 130 g | 130 g | 130 g |  | 130 g | 130 g | 130 g | 130 g | 130 g | 130 g |  |
| WS solvent-2 | WS-2 | WS-2 | WS-2 | None | WS-2 | WS-2 | WS-2 | WS-2 | WS-2 | WS-2 | — |
|  | 60 g | 60 g | 60 g |  | 60 g | 60 g | 60 g | 60 g | 60 g | 60 g |  |
| Surfactant-2 | Surf-1 | Surf-1 | None | Surf-1 | Surf-1 | Surf-1 | Surf-1 | Surf-1 | Surf-1 | Surf-1 | — |
|  | 7.2 g | 7.2 g |  | 7.2 g | 7.2 g | 7.2 g | 7.2 g | 7.2 g | 7.2 g | 7.2 g |  |
| Aqueous phase-1 | Water | Water | None | Water | Water | Water | Water | Water | Water | Water | — |
|  | 700 ml | 700 ml |  | 700 ml | 700 ml | 700 ml | 700 ml | 700 ml | 700 ml | 700 ml |  |

(Remark)
HB solvent: High boiling point organic solvent
LB solvent: Low boiling point organic solvent
PBMA: Polybutyl methacrylate
Surf-1: Sodium dioctylsulfosuccinate
LB-1: Ethyl acetate
Volume*: Volume after removing the low boiling point organic solvent
WS solvent: Water-soluble organic solvent TABLE 1-continued

| Sample No. | 101 | 102 | 103 | 104 | 105 | 106 | 107 | 108 | 109 | 110 | 111 |
|---|---|---|---|---|---|---|---|---|---|---|---|

WS-1: Diethylene glycol
WS-2: Glycerin

The volumetric average diameter of oil drops or particles in each sample was measured by means of an apparatus (e.g., Microtruck UPA, Nikkiso Co., Ltd.). The results are set forth in Table 2.

A dye, a high boiling point organic solvents, a polymer and ethyl acetate were mixed in the ratio shown in Table 1, and dissolved at 70° C. The mixture was heated on a hot plate at 100° C. until ethyl acetate did not smell. It was confirmed that the weight of the remaining mixture was the total weight of the components except ethyl acetate, and hence that ethyl acetate was completely evaporated. Sodium dioctylsulfosuccinate (surfactant) was not added. While the above-prepared liquid (model of oil phase) was kept at 25° C., its viscosity was measured by a rotating-vibrating viscometer (VISCOMATE VM-100A, YANAICHI ELECTRIC CO., LTD.). The probe was usually set at M range (for middle viscosity, 100 to 10,000 mPa·s). If the viscosity is lower than 500 mPa·s, the probe was set at L range (for low viscosity, 0.4 to 500 mPa·s). The results are set forth in Table 2.

The specific gravity of the oil phase model was also measured at 25° C. The results are set forth in Table 2.

Each of Samples 101 to 111 was loaded in a cartridge of ink-jet printer (PM670C, EPSON Ltd.), and then images were printed on commercially available photo-printing paper (photo-glossy paper EX, FUJI PHOTO FILM CO., LTD.; PM photographic paper, EPSON Ltd.; Professional photo paper, CANNON INC.). The printing performance was evaluated according to whether undesired streaks were observed in the solid area of the printed images or not. After the images were left for 1 hour, they were rubbed with an eraser and the wear resistance was evaluated according to whether the images were faded or not. The images were further left for 1 day, the same test was carried out to evaluate the wear resistance. Each sample was kept at 60° C. and 4° C. (in a refrigerator) for 1 week, and then the state (turbidity, precipitation, creaming) of the sample was observed. The results are set forth in Table 2.

TABLE 2

| Sample No. | 101 | 102 | 103 | 104 | 105 | 106 | 107 | 108 | 109 | 110 | 111 |
|---|---|---|---|---|---|---|---|---|---|---|---|
| Viscosity | 1,395 mPa·s | 3,522 mPa·s | 65 mPa·s | 1,395 mPa·s | 4,609 mPa·s | 449 mPa·s | 580 mPa·s | 5,103 mPa·s | 1,260 mPa·s | >10,000 mPa·s | Solid |
| Gravity | 1.03 | 1.09 | 1.00 | 1.02 | 1.00 | 0.89 | 1.16 | 1.06 | 1.03 | 1.12 | — |
| Diamet. | 19 nm | 25 nm | 17 nm | 17 nm | 26 nm | 22 nm | 24 nm | 32 nm | 250 nm | 80 nm | 227 nm |
| Print | AA | AA | BB | AA | AA | AA | AA | AA | CC | BB | AA |
| 1 H* | AA | AA | AA | AA | BB | AA | AA | BB | AA | DD | DD |
| 1 D* | AA | AA | AA | AA | AA | AA | AA | AA | AA | DD | DD |
| 1 H** | AA | BB | AA | AA | BB | AA | AA | BB | AA | DD | DD |
| 1 H*** | AA | BB | AA | AA | BB | AA | AA | BB | AA | DD | DD |
| 7D 4° C. | AA | AA | AA | BB | BB | DD* | DD** | BB | CC | BB | BB |
| 7D 60° C. | AA | AA | AA | AA | BB | DD* | DD** | BB | CC | BB | BB |

(Remark)
Viscosity*: Viscosity of oil phase
Gravity: Specific gravity of oil phase
Diamet.: Volumetric average diameter of oil droplets
Print: Printing performance (streaks)
AA: No streak observed
BB: Allowable streaks observed
CC: Remarkable streaks observed
1 H*: Wear resistance 1 hour after forming an image on a photo-glossy paper EX
1 D*: Wear resistance 1 day after forming an image on a photo-glossy paper EX
1 H**: Wear resistance 1 hour after forming an image on a PM photographic paper
1 H***: Wear resistance 1 hour after forming an image on a Professional photo paper
AA: Not faded
BB: Allowably faded
CC: Considerably faded
DD: Completely faded
7D 4° C.: State of ink stored for 7 days in a refrigerator at 4° C.
7D 60° C.: State of ink stored for 7 days at 60° C.
AA: Not changed
BB: Slightly turbid
CC: Considerably turbid
DD: Not emulsified
DD*: Creaming
DD*: Precipitation The inks having a viscosity of not more than 8,000 mPa·s have relatively strong wear resistance and are fixed well, as compared with a pigment ink (Sample 110). The inks having a specific gravity of 0.90 to 1.15 are fixed well immediately after printed, and are excellent in storing stability.

EXAMPLE 2

The procedure for preparing Sample 101 was repeated except that a yellow dye (Y-1) or a cyan dye (C-1) was used in place of a magenta dye (d-7), to prepare a yellow ink (Sample 201) or a cyan ink (Sample 202).

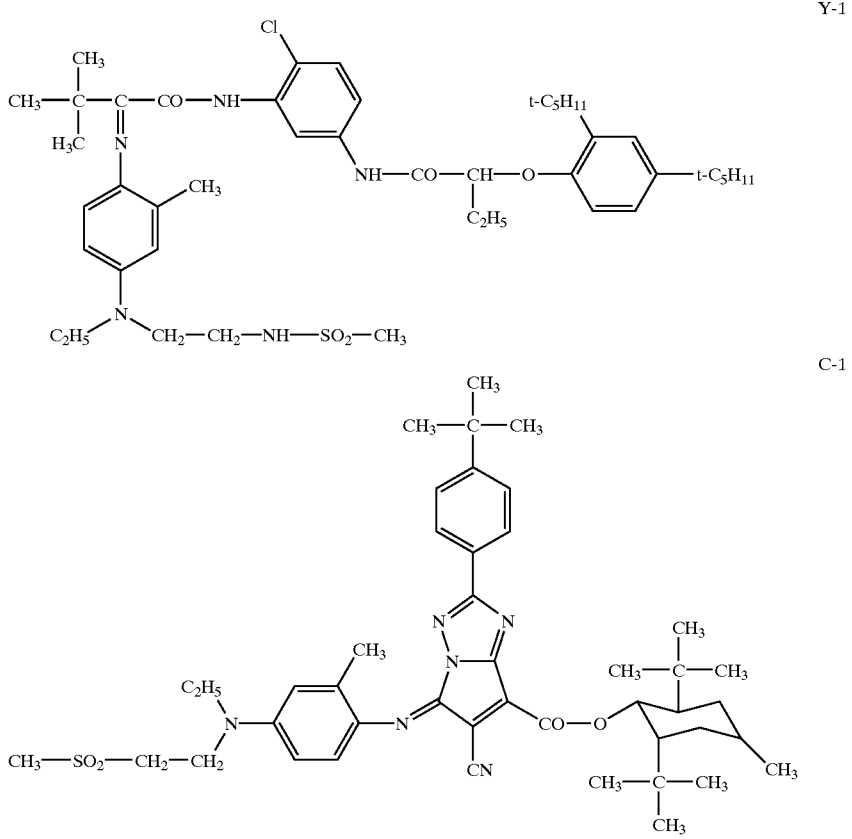

An image was printed with each prepared ink by an inkjet printer (PM770C, EPSON LTD.), and thereby it was confirmed that the ink was spread and fixed well and was excellent in printing performance and storing stability.

The magenta ink (Sample 101), the yellow ink (Sample 201) and the cyan ink (Sample 202) were mixed to prepare a black ink. An image was printed with the prepared black ink by an ink-jet printer (PM770C, EPSON LTD.), and thereby it was confirmed that the ink was spread and fixed well and was excellent in printing performance and storing stability.

EXAMPLE 3

Each sample prepared in Example 1 was loaded in a cartridge of ink-jet printer (BJ-F850, CANNON INC.), and then images were printed on photographic glossy paper (GP-301, CANNON INC.) to evaluate the characteristics of the ink.

The results were the same as those in Example 1.

The present invention enables a dispersion ink to be spread and fixed well on photographic glossy paper, and the invention also makes it possible to prepare an ink of dispersion type excellent in printing performance, image fixing and storing stability.

I claim:

1. A jet printing ink composition containing a dye dissolved in an oil phase, which is emulsified in an aqueous medium, wherein the oil phase comprises an organic solvent having a boiling point of not lower than 150° C., said oil phase having a viscosity in the range of 20 to 8,000 mPa·s at 25° C., and wherein droplets of the emulsified oil phase have a volumetric average diameter of not larger than 100 nm.

2. The jet printing ink composition as defined in claim 1, wherein the oil phase has a specific gravity in the range of 0.90 to 1.15 at 25° C.

3. The jet printing ink composition as defined in claim 1, wherein the oil phase has a viscosity in the range of 100 to 4,000 mPa·s at 25° C.

4. The jet printing ink composition as defined in claim 1, wherein the oil phase comprises the organic solvent in amount of 0.1 to 1.0 weight parts based on 1 weight part of the dye.

5. The jet printing ink composition as defined in claim 1, wherein the oil phase comprises the organic solvent in amount of 0.5 to 4 weight parts based on 1 weight part of the dye.

6. The jet printing ink composition as defined in claim 1, wherein the droplets of the emulsified oil phase have a volumetric average diameter in the range of 1 to 50 nm.

7. A process for the preparation of a jet printing ink composition, which comprises the steps of: dissolving a dye in an organic solvent having a boiling point of not lower than 150° C. to form an oil phase having a viscosity in the range of 20 to 8,000 mPa·s at 25° C.; and then emulsifying the oil phase in an aqueous medium to form droplets of the oil phase having a volumetric average diameter of not larger than 100 nm.

8. The process as defined in claim 7, wherein the oil phase further comprises an organic solvent having a boiling point in the range of 30° C. to 150° C., which is evaporated from the composition after emulsifying the oil phase in the aqueous medium.

9. The process as defined in claim 8, wherein the organic solvent having a boiling point in the range of 30° C. to 150° C. is selected from the group consisting of an ester, an alcohol, a ketone, an amide and an ether.

10. The process as defined in claim 7, wherein the oil phase is emulsified in the aqueous medium by using a high pressure dispersing apparatus.

11. The process as defined in claim 10, wherein the oil phase is emulsified in the aqueous medium by using a high pressure homogenizer.

12. An ink-jet recording method in which an image is recorded with ink drops on an image-receiving material, said image-receiving material comprising a support and an image-receiving layer containing white inorganic pigment particles, and said ink drops being jetted out according to recording signals, wherein the ink drops consist of a jet printing ink composition containing a dye dissolved in an oil phase, which is emulsified in an aqueous medium, and wherein the oil phase comprises an organic solvent having a boiling point of not lower than 150° C., said oil phase having a viscosity in the range of 20 to 8,000 mPa·s at 25° C., and wherein droplets of the emulsified oil phase have a volumetric average diameter of not larger than 100 nm.

* * * * *